(12) United States Patent
Sasaki

(10) Patent No.: US 10,702,989 B2
(45) Date of Patent: Jul. 7, 2020

(54) METHOD OF CONTROLLING ROBOT APPARATUS, ROBOT APPARATUS, AND METHOD OF MANUFACTURING ARTICLE

(71) Applicant: CANON KABUSHIKI KAISHA, Tokyo (JP)

(72) Inventor: Masatoshi Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 15/617,699

(22) Filed: Jun. 8, 2017

(65) Prior Publication Data

US 2017/0361464 A1    Dec. 21, 2017

(30) Foreign Application Priority Data

Jun. 20, 2016   (JP) .................. 2016-122168

(51) Int. Cl.
  *B25J 9/16*  (2006.01)
  *B25J 19/02*  (2006.01)
(52) U.S. Cl.
  CPC .......... *B25J 9/1666* (2013.01); *B25J 9/1641* (2013.01); *B25J 9/1687* (2013.01); *B25J 19/023* (2013.01);
  (Continued)
(58) Field of Classification Search
  CPC ...... B25J 9/1666; B25J 9/1641; B25J 9/1687; B25J 19/023; G05B 2219/39001; G05B 2219/40583; G05B 2219/45064; G05B 2219/37555; G05B 2219/41265; G05B 2219/40564
  See application file for complete search history.

(56) References Cited

U.S. PATENT DOCUMENTS 6,970,802 B2 *  11/2005  Ban .................. B25J 9/1641
                                                    700/59
9,505,133 B2 *  11/2016  Osaka ................ B25J 13/088
(Continued)

FOREIGN PATENT DOCUMENTS

DE  10 2017 002 608    9/2017
EP        1 431 706      6/2004
JP       H7-200018      8/1995

OTHER PUBLICATIONS

European Search Report dated Nov. 23, 2017 during prosecution of related European application No. 17176298.2.

*Primary Examiner* — Jason Holloway
(74) *Attorney, Agent, or Firm* — Venable LLP

(57) ABSTRACT

A robot apparatus includes: a robotic arm provided with a robotic hand capable of changing its position and its orientation by using joints; a visual sensor which measures a position or an orientation of a gripped object gripped with the robotic hand at a measurement teaching point; and a control device. The control device controls the position or the orientation of the gripped object when the gripped object is attached to an attachment target object at a corrected teaching point corrected based on a measurement result by the visual sensor. In this case, the control device determines a measurement teaching point, where the measurement with the visual sensor takes place, such that a driving direction of each of the joints from the measurement teaching point to the corrected teaching point is set to a definite driving direction.

19 Claims, 17 Drawing Sheets

(52) U.S. Cl.
CPC .............. *G05B 2219/37555* (2013.01); *G05B 2219/39001* (2013.01); *G05B 2219/40564* (2013.01); *G05B 2219/40583* (2013.01); *G05B 2219/41265* (2013.01); *G05B 2219/45064* (2013.01)

(56) References Cited

U.S. PATENT DOCUMENTS

| | | | | |
|---|---|---|---|---|
| 9,656,388 | B2* | 5/2017 | Nammoto | B25J 9/1612 |
| 9,904,271 | B2* | 2/2018 | Hayata | B25J 9/1682 |
| 2004/0133382 | A1* | 7/2004 | Ban | B25J 9/1641 |
| | | | | 702/153 |
| 2007/0276539 | A1* | 11/2007 | Habibi | B25J 9/1612 |
| | | | | 700/245 |
| 2009/0105880 | A1* | 4/2009 | Okazaki | B25J 9/1633 |
| | | | | 700/258 |
| 2009/0171505 | A1* | 7/2009 | Okazaki | B25J 9/1676 |
| | | | | 700/258 |
| 2011/0078508 | A1* | 3/2011 | Komatsu | B25J 9/1075 |
| | | | | 714/37 |
| 2012/0010747 | A1* | 1/2012 | Okazaki | G05B 19/423 |
| | | | | 700/253 |
| 2014/0309762 | A1* | 10/2014 | Hayata | B25J 9/1682 |
| | | | | 700/114 |
| 2015/0165620 | A1* | 6/2015 | Osaka | B25J 13/088 |
| | | | | 700/250 |
| 2016/0221189 | A1* | 8/2016 | Nilsson | B25J 9/1653 |
| 2016/0297069 | A1* | 10/2016 | Negishi | B25J 9/1638 |
| 2017/0274534 | A1* | 9/2017 | Takahashi | B25J 9/1641 |

* cited by examiner

FIG. 10A
WORKPIECE VARIATION RANGE

| | X[mm] | Y[mm] | Z[mm] | rX[°] | rY[°] | rZ[°] |
|---|---|---|---|---|---|---|
| MAX | +1 | +2 | +3 | +3 | +1 | +5 |
| MIN | -3 | -2 | -1 | -5 | -1 | -3 |

1401 / 1402

FIG. 10B
ATTACHMENT CORRECTION RANGE

| | X[mm] | Y[mm] | Z[mm] | rX[°] | rY[°] | rZ[°] |
|---|---|---|---|---|---|---|
| MAX | +3 | +2 | +1 | +5 | +1 | +3 |
| MIN | -1 | -2 | -3 | -3 | -1 | -5 |

1403 / 1404

FIG. 10C
CORRECTED MOVABLE RANGE OF JOINT AXIS

| | J1[°] | J2[°] | J3[°] | J4[°] | J5[°] | J6[°] |
|---|---|---|---|---|---|---|
| RESULTS OF INVERSE KINEMATICS CALCULATION | 11.00 | -1.02 | 65.63 | 12.15 | -65.10 | -5.18 |
| | 11.25 | -0.98 | 65.28 | 12.55 | -63.83 | -5.43 |
| | 10.75 | -1.06 | 65.97 | 11.75 | -66.38 | -4.97 |
| MAX | 11.37 | -0.59 | 65.97 | 14.90 | -63.62 | -4.02 |
| MIN | 10.64 | -1.45 | 65.28 | 9.45 | -66.62 | -6.41 |

1405

FIG. 12A
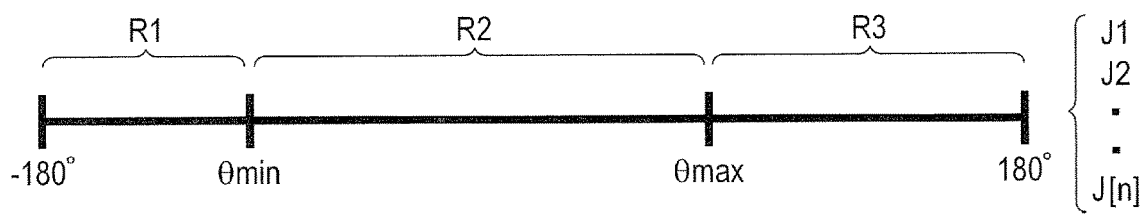
FIG. 12B
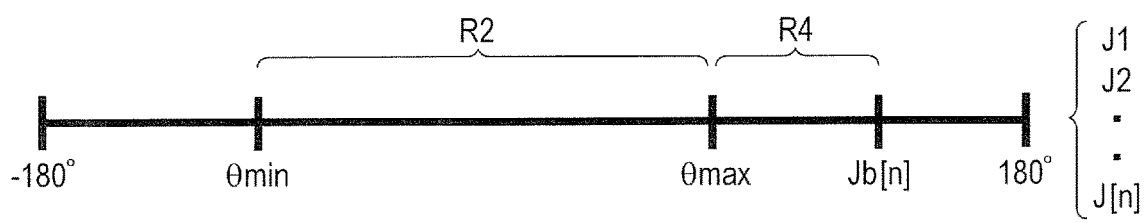
FIG. 13
| | X | Y | Z | rX | rY | rZ |
|---|---|---|---|---|---|---|
| 1 | MAX | MAX | MAX | MAX | MAX | MAX |
| 2 | | | | | | MIN |
| 3 | | | | | MIN | MAX |
| 4 | | | | | | MIN |
| 5 | | | | MIN | MAX | MAX |
| 6 | | | | | | MIN |
| 7 | | | | | MIN | MAX |
| 8 | | | | | | MIN |
| 9 | | | | MAX | MAX | MAX |
| 10 | | | | MAX | | MIN |
| 55 | MIN | MIN | MIN | MIN | MIN | MIN |
| 56 | | | | | | MIN |
| 57 | | | | | MAX | MAX |
| 58 | | | | MAX | | MIN |
| 59 | | | | | MIN | MAX |
| 60 | | | | | | MIN |
| 61 | | | | | MAX | MAX |
| 62 | | | | MIN | | MIN |
| 63 | | | | | MIN | MAX |
| 64 | | | | | | MIN |
1501  1502  1503

METHOD OF CONTROLLING ROBOT APPARATUS, ROBOT APPARATUS, AND METHOD OF MANUFACTURING ARTICLE

BACKGROUND OF THE INVENTION

Field of the Invention

The present invention relates to a method of controlling a robot apparatus which measures a position or an orientation of a gripped object gripped with a gripping device of a robotic arm by using a measurement device, and controls an operation to manufacture an article by attaching the gripped object to an attachment target object being a target for attachment based on a result of the measurement. The present invention also relates to the robot apparatus.

Description of the Related Art

An assembly operation to attach a gripped object gripped with a robotic arm to an attachment target object has heretofore been performed. As the robotic arm of this type, there has been known a robotic arm adopting a vertically articulated structure which includes rotary joints and links connected to one another by using the rotary joints. Meanwhile, a transmission utilizing a strain wave gearing mechanism and a drive source such as a servo motor are used in each rotary joint of the robotic arm of this type.

The gripped object and the attachment target object mentioned above are thought to be components having male and female shapes corresponding to each other such as a cylindrical (or prismatic) member and a corresponding circular (or square) hole. In the meantime, an operation to cause the robotic arm to grip a connector (of a male type, for example) as the gripped object provided at an end of a cable and inserting and fitting the connector into another connector or a receptacle (of a corresponding female type, for example) as the attachment target object also falls within the aforementioned assembly operation.

For the case where the above-described assembly operation is required to be executed accurately, there is known a technique to correct relative positions and relative orientations between the gripped object gripped with the robotic arm and the attachment target object such that the relative positions and the relative orientations are settled as designed.

For example, in a case where the gripped object like the above-mentioned connector is gripped with the robotic arm, fingers at a front end of the robotic arm do not always grip the gripped object every time at the same relative positions and the same relative orientations (gripping orientations). In this case, to insert the connector into the receptacle or the like, it is possible to insert the connector in the state right opposed to the receptacle by changing or correcting an operation of the robotic arm depending on the gripping orientations.

For example, there is a technique to measure the relative positions and the relative orientations between the gripped object and the attachment target object by using a measurement device, and to generate robot control data based on which the robot arm moves these objects from the relative positions and the relative orientations detected with a sensor to the relative positions and the relative orientations in an initial state of attachment or to correct the generated robot control data. A visual sensor such as a (digital) camera is used as the measurement device. In the technique of this type, the robot control data is generated in the form of a list of teaching points, for example. In the meantime, it is known that the teaching points are expressed in a form using three-dimensional coordinates representing movement of a reference position (such as a point at a front end of an arm) of the robotic arm, and rotational angles of rotary joints (joint orientations) of the robotic arm.

Meanwhile, for a case where the visual sensor such as the camera is installed to measure the relative positions and the relative orientations of the gripped object and the attachment target object prior to the attachment, there is also known a technique to control relative positions and relative orientations (such as shooting distances and shooting angles) between the sensor and the gripped object as well as the attachment target object. For example, before measuring the relative positions and the relative orientations between the gripped object and the attachment target object prior to the attachment, this technique performs the control to determine a position of the sensor such as the camera such that the sensor can properly measure the relative positions and the relative orientations between the gripped object and the attachment target object.

Here, when the robotic arm is operated in response to the relative positions and the relative orientations between the gripped object and the attachment target object detected with the visual sensor such as the camera, the robot control data to cause a certain rotary joint of the arm to reverse its rotational driving direction may be generated (or corrected) at a certain timing. In this case, a hysteresis error may occur in consequence of a backlash of a decelerator in the rotary joint of the arm, thereby deteriorating accuracy of position-orientation control of the robotic arm.

Techniques for reducing such a hysteresis error attributed to a backlash of a decelerator in a rotary joint have heretofore been known. For instance, there is a technique of robotic arm control which is designed to determine a rotational direction of each joint axis of a robot, and to cause a joint to conduct a corrective action corresponding to an amount of backlash of the decelerator when the rotational direction of the joint is reversed (Japanese Patent Application Laid-Open No. H07-200018, for example).

However, the above-described technique according to Japanese Patent Application Laid-Open No. H07-200018 uses a fixed value as the value corresponding to the backlash of the decelerator to be corrected, and may fail to correct the backlash in an amount attributed to a manufacturing error or an individual difference of the decelerator. As a consequence, high-accuracy control may not be expected from this technique.

SUMMARY OF THE INVENTION

In view of the above-mentioned problem, an object of the present invention is to enable control (and correction) of an operation of a robotic arm at high accuracy based on relative positions and relative orientations of the robotic arm, a gripped object, and an attachment target object, which are detected with a measurement device such as a visual sensor. For example, the present invention intends to enable control (correction) of robot control data in an action of an arm after detection with the sensor in such a way as to achieve the action of the arm supposed to be realized by rotationally driving each of all rotary joints of the robotic arm in a definite direction. Thus, it is possible to reduce an adverse effect of a hysteresis error attributed to backlashes of the rotary joints, and to achieve robot control at high accuracy.

To attain the object, the present invention provides a method of controlling a robot apparatus including a robotic arm provided with a gripping device capable of changing any of a position and an orientation by using a joint, and a control device configured to control any of a position and an orientation of a gripped object gripped with the gripping device in an action of attaching the gripped object to an attachment target object, the method including: causing a measurement device to measure any of the position and the orientation of the gripped object at a measurement teaching point determined such that a driving direction of the joint in a movement to an attachment teaching point is set to a definite driving direction; and causing the robotic arm to correct any of the position and the orientation of the gripped object based on a result of the measurement.

According to the above-described framework, when the robotic arm moves from the measurement teaching point where the measurement with the measurement device takes place to the attachment teaching point corrected based on the measurement, the robot apparatus is controlled such that the driving direction of the joint of the robotic arm is set to the definite driving direction. As a consequence, it is possible to control the position and the orientation of the gripped object at high accuracy without being affected by a position-orientation control error attributed to a backlash of a drive (transmission) system of the joint of the robotic arm, thereby enabling an attachment operation at high accuracy.

Further features of the present invention will become apparent from the following description of exemplary embodiments with reference to the attached drawings.

BRIEF DESCRIPTION OF THE DRAWINGS

FIG. 10A is an explanatory diagram showing an example of variation ranges of a position and an orientation of a workpiece in the robot apparatus of Example 1.

FIG. 10B is an explanatory diagram showing a calculation example of attachment correction ranges derivable from the variation ranges of the position and the orientation of the workpiece depicted in FIG. 10A.

FIG. 10C is an explanatory diagram showing a calculation example of corrected movable ranges derivable from the variation ranges of the position and the orientation of the workpiece depicted in FIG. 10A.

FIGS. 12A and 12B are explanatory diagrams showing a corrected movable range and a shooting region of a joint axis in Example 1 of the present invention.

FIG. 13 is a table showing 64 combinations to carry out inverse kinematics calculation concerning the position and the orientation of the robot apparatus.

DESCRIPTION OF THE EMBODIMENTS

An embodiment for carrying out the present invention will be described below with reference to examples shown in the accompanying drawings. Note that the examples shown below are mere examples and a person skilled in the art can appropriately change detailed configurations, for instance, within the scope not departing from the gist of the present invention. It is to be also noted that numerical values cited in the embodiment are just for reference and do not limit the present invention.

EXAMPLES

Example 1

Figure 17:
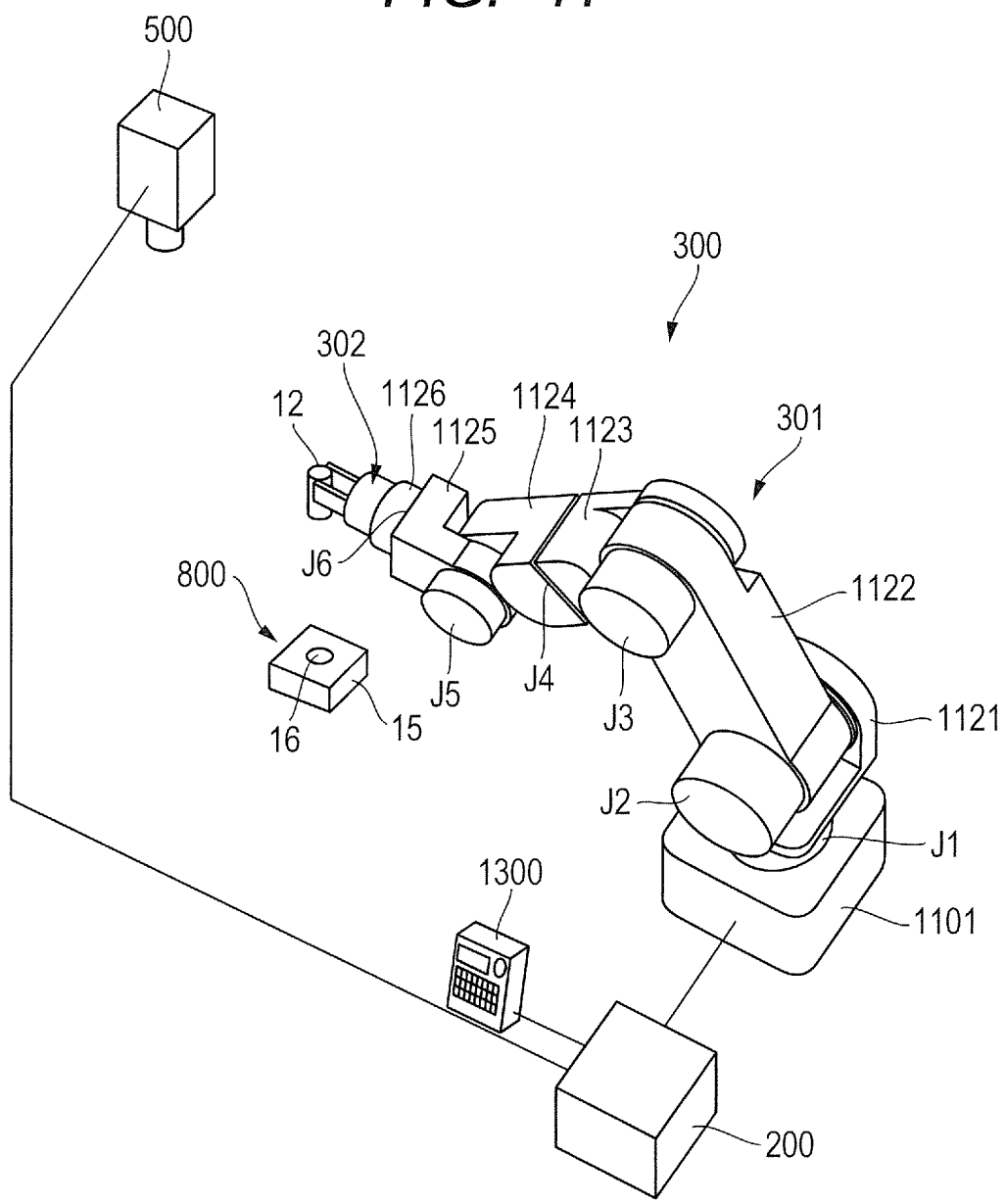
FIG. 17 is a perspective view showing a schematic configuration of the robot apparatus capable of carrying out the present invention.

FIG. 17 shows a schematic configuration of a robot apparatus of this Example 1. A robot apparatus 300 shown in FIG. 17 is constructed as an industrial robot apparatus to perform such work as assembly of a machine or an electronic device, for example. The robot apparatus 300 in FIG. 17 includes a six-axis vertically articulated robotic arm 301, a control device 200 to control the robotic arm 301, a teaching pendant 1300 connected to the control device 200, and a visual sensor 500.

The robotic arm 301 is assembled on a base unit 1101. The robotic arm 301 includes multiple links 1121 to 1126 each of which transmits a displacement and a force. The links 1121 to 1126 are connected in series by using multiple joints J1 to J6 that join these links in such a way as to be turnable or rotatable relative to one another.

A robotic hand 302 is joined to the link 1126 at a front end of the robotic arm 301. The robotic hand 302 is an end effector (tool) for gripping and manipulating a workpiece, which is an object of manipulation such as assembly work.

In this Example 1, the visual sensor 500 installed as a position-orientation measurement device is used for measuring a position and an orientation of a gripped object (the workpiece) gripped with the robotic hand 302 as described later. The visual sensor 500 can be formed from a digital camera that includes a solid-state image pick-up element such as a CMOS image sensor and a CCD image sensor.

The visual sensor 500 is disposed by way of fixing the visual sensor 500 to a ceiling and the like in an environment where the robot apparatus 300 is installed, or onto a tripod or an arbitrary pedestal. Nonetheless, the visual sensor 500 does not always have to be fixedly disposed. For instance, a shooting optical axis (a shooting region) of the visual sensor 500 may be subjected to movable (variable) control by using a different movable stage or a different robot apparatus (neither of which is shown). It is to be noted, however, that the visual sensor 500 is supposed to be fixed or movably disposed in such a way as to be capable of shooting an image around the gripped object (the workpiece) and a member serving as an attachment target when the visual sensor 500 measures the position and the orientation of the gripped object (the workpiece) gripped with the robotic hand 302 as described later.

Meanwhile, aside from such a monocular visual sensor, the visual sensor 500 serving as the measurement device may also be formed from a stereo (binocular) visual sensor which can three-dimensionally measure the position and the orientation of the object. In the meantime, a different measurement device corresponding to the visual sensor 500 of this Example 1 may be constructed in the form of an arbitrary measurement device such as a laser range finder, as long as such an arbitrary measurement device is capable of measuring the position and the orientation of the object by use of an ultrasonic wave, a laser beam, and other measurement media.

The joints J1 to J6 in FIG. 17 are driven via a drive system (details of which are not shown) formed from servo motors, transmissions, and the like. While the joints J1 to J6 are assumed to be rotary joints in this Example 1, the configuration and control procedures according to the present invention can also be carried out even when part (or all) of these joints are prismatic joints. When the drive system of each of the joints J1 to J6 is of a rotary drive system, a servo motor or the like is used as a rotary drive source of this drive system, and a transmission (a decelerator) that changes gears therein (mostly in a decelerating manner) is disposed in the drive system (a transmission system). In each joint of the above-described robotic arm, a strain wave gearing mechanism which is small in size, light in weight, and provided with a high reduction ratio is suitably used for the decelerator.

When each transmission (decelerator) used in the drive system for the joints J1 to J6 is formed of a gear train, such a transmission system potentially involves a transmission error such as a backlash as discussed previously. In many cases, a transmission system containing the transmissions (decelerators) of this type causes a transmission error between an input end and an output end of the system, which is attributed to a backlash.

In particular, the transmission error attributed to the backlash in the gear transmission system of this type exhibits a hysteresis characteristic. For instance, even when a drive amount (such as a rotation angle and the number of rotations) of the motor at the input end of the transmission (the decelerator) for the joint J1 (or for any of other joints J2 to J6) remains constant, a difference in drive amount (such as a rotational angle) occurs at the output end depending on a driving direction of either a forward direction or a backward direction. In contrast, such a non-linear characteristic between the input and output ends does not occur as long as the driving direction of the joint continues in the same direction.

Figure 18:
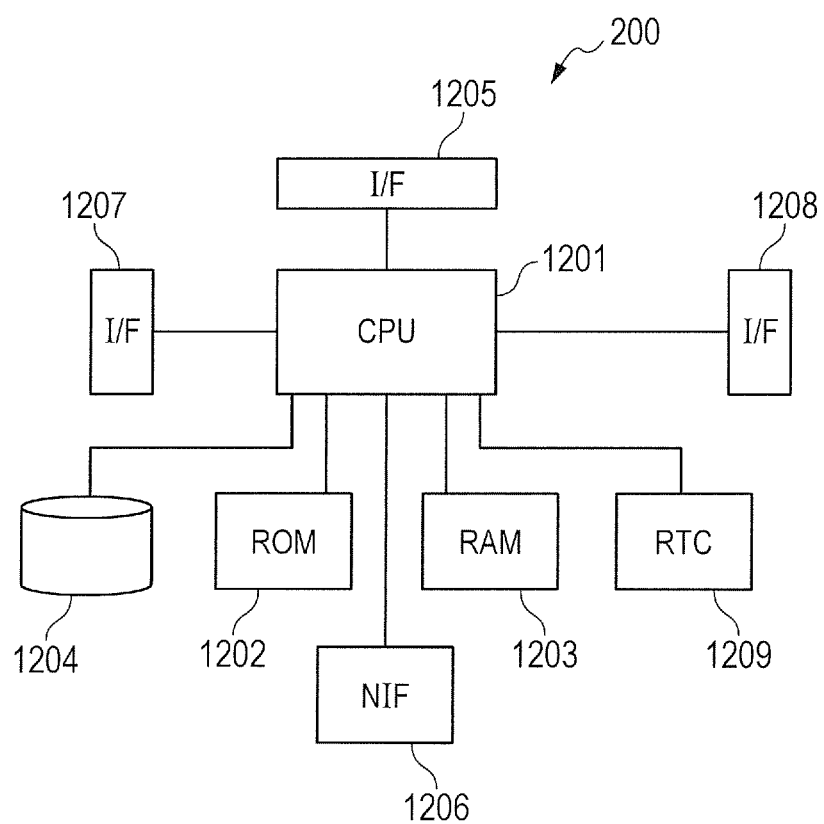
FIG. 18 is a block diagram showing a configuration example of a control device of the robot apparatus in FIG. 17.

The control device 200 in FIG. 17 can be formed as shown in FIG. 18, for example. A control system in FIG. includes a CPU 1201 formed from a general-purpose microprocessor or the like, a ROM 1202, a RAM 1203, an external storage device 1204, interfaces 1205, 1207, and 1208, a network interface 1206, and so forth. Moreover, the control system in FIG. 18 is provided with an RTC (real-time clock) 1209. The RTC 1209 can be used for time-keeping processing as appropriate in the control to be described later.

The ROM 1202 is used for storing an access control program and control data to be described later, for example. Here, a storage area in the ROM 1202 for storing the access control program and the control data may be formed from a storage device such as an E(E)PROM, so that the access control program and the control data stored therein can be updated later. The RAM 1203 is formed from a DRAM device or the like, and is used as a work area for allowing the CPU 1201 to execute a variety of control and processing. Functions concerning control procedures for the robotic arm 301 to be described later are realized by causing the CPU 1201 to execute the access control program of this Example 1.

The external storage device 1204 is formed from a disk drive such as an SSD and an HDD. The external storage device 1204 can store a robot control program, teaching point data, and/or the access control program and the like to be described later in the form of files. Here, the external storage device 1204 may be formed from a removable storage medium such as various types of optical disks, a removable disk drive such as a removable SSD and a removable HDD, or a removable flash memory. The variety of removable computer-readable record media cited above can be used for installing and updating the access control program on the ROM 1202 (the E(E)PROM area), the program constituting part of the present invention, for example. In this case, each of the variety of the removable computer-readable record media stores the control program constituting the present invention, and therefore, such a record medium per se constitutes the present invention as well.

Figure 1:
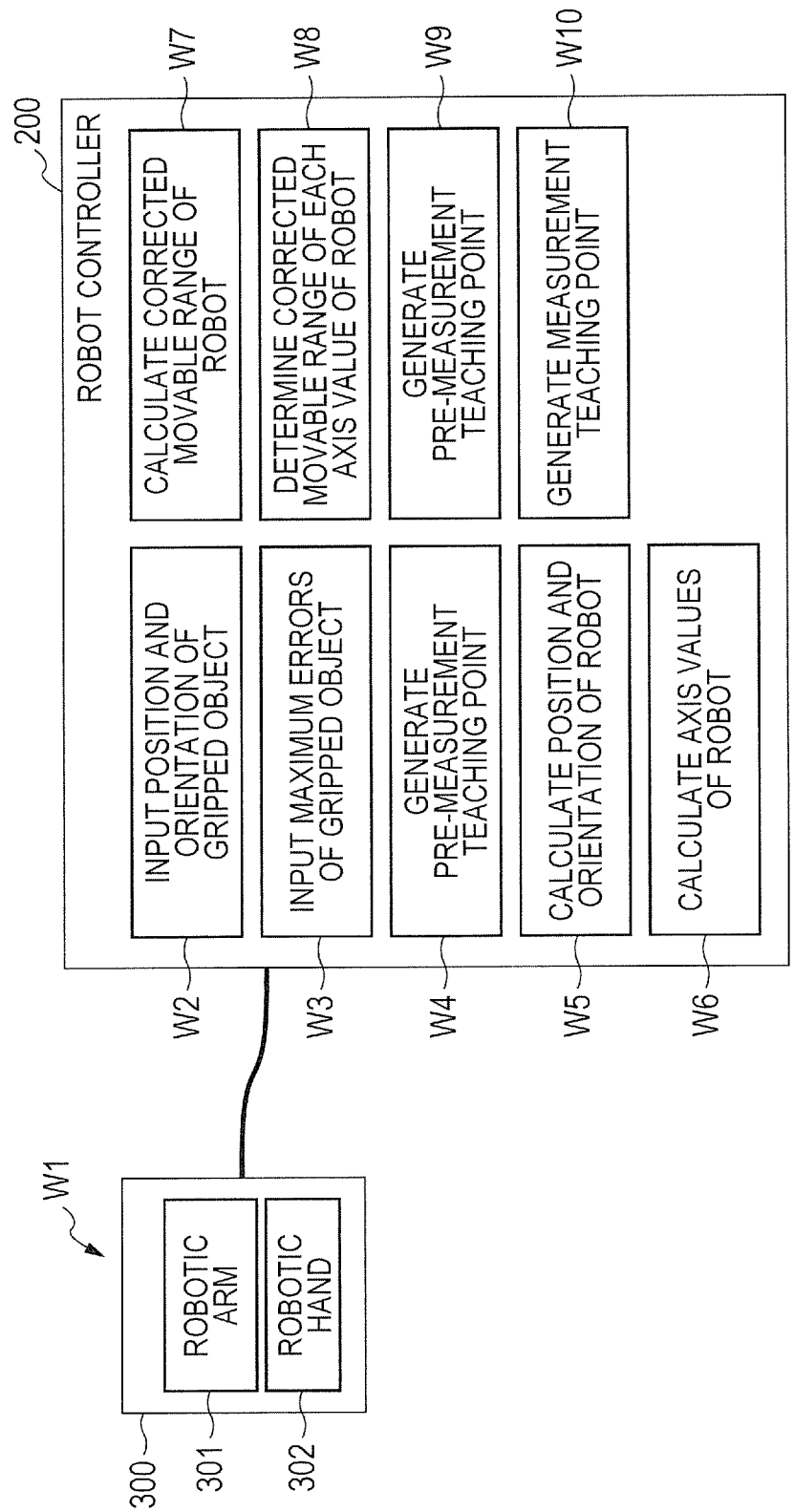
FIG. 1 is a functional block diagram of a control device of a robot apparatus according to Example 1 of the present invention.

The CPU 1201 executes a production control program, the robot control program, firmware, the access control program, and the like stored in any of the ROM 1202 and the external storage device 1204. Thus, functional blocks of the control device 200 are realized as shown in FIG. 1, for example.

Moreover, in FIG. 18, the control device 200 is provided with the interfaces 1207 and 1208. For example, the interface 1208 is used for controlling communication with the robotic arm 301. The CPU 1201 can cause the robotic arm 301 to execute a robot action in response to a robot program or the like taught in advance, by transmitting a control signal in conformity with a given signal format through the interface 1208. Meanwhile, the interface 1207 is used for communication with a teaching device such as the teaching pendant 1300 (or with a different robot control device). Each of these interfaces 1207 and 1208 is formed from an arbitrary communication interface (such as a parallel communication interface or a serial communication interface) as described above.

The network interface (NIF) 1206 is used for communication with a different control terminal (not shown), the different robot control device, a server on a network, and the like. This network interface 1206 can adopt various network communication methods through wired and wireless connection, such as IEEE802.3 in the wired connection and IEEE802.11 and 802.15 in the wireless connection. Note that the communication with the robotic arm 301 as well as a robot operation device (such as the teaching pendant 1300) may be conducted entirely through the network interface 1206.

The robot apparatus 300 in FIG. 17 is provided with the teaching pendant 1300 serving as the teaching device which teaches teaching points for activating the robotic arm 301. The teaching pendant 1300 includes a keyboard (or any of a touch panel, an operation dial, and the like) operable in accordance with operation methods such as a step operation and a jog operation. The teaching pendant 1300 is configured to be capable of programming (teaching) an action of the robotic arm 301 and modifying the robot control data (the robot program) that has been taught in an actual installation environment.

Figure 16:
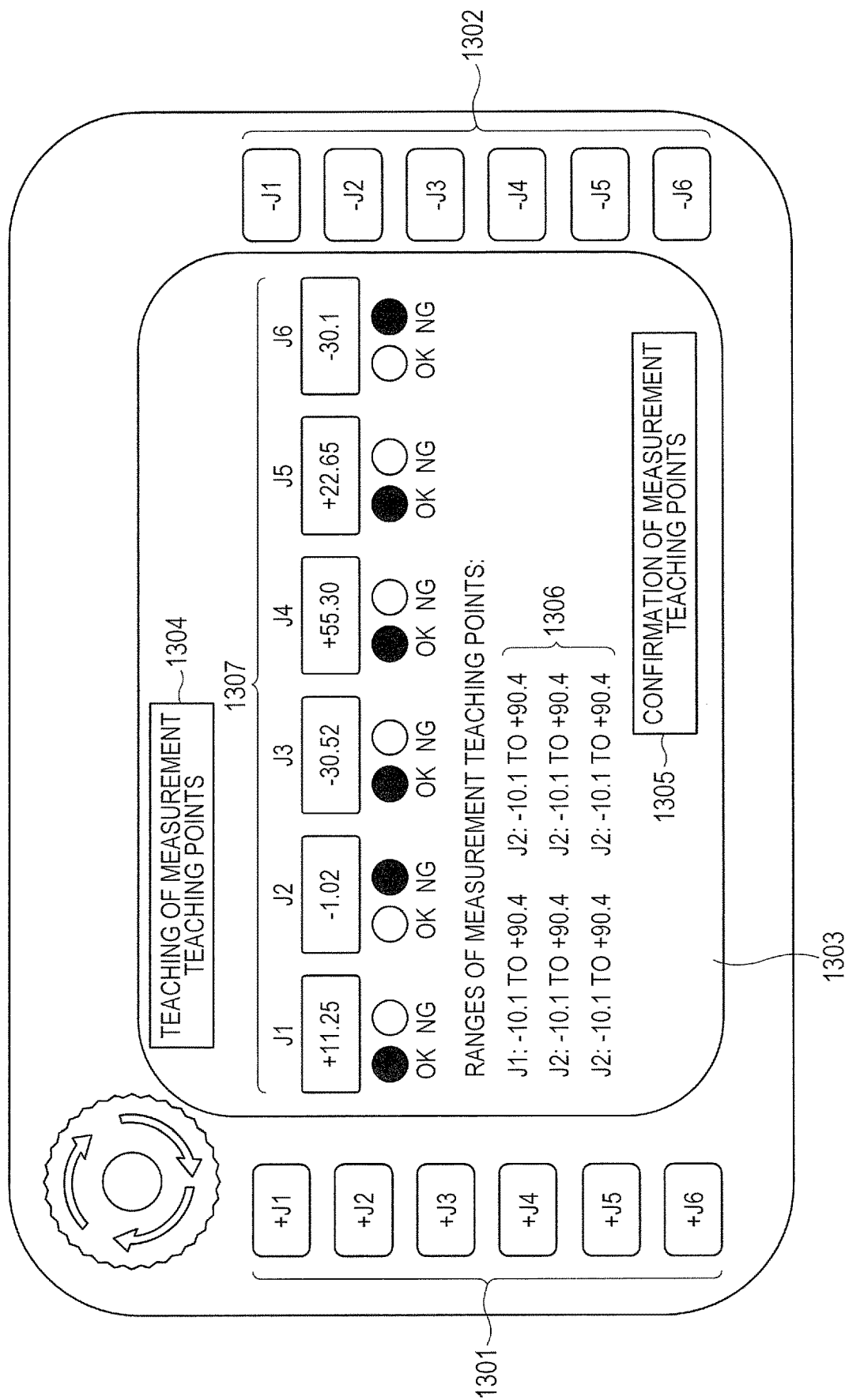
FIG. 16 is an explanatory diagram showing a configuration example of a user interface of a teaching pendant in a robot apparatus capable of carrying out the present invention.

FIG. 16 shows a configuration example of an operation screen of the teaching pendant 1300. Operating keys 1301 and 1302 used for turning the joints J1 to J6 of the robotic arm 301 respectively in + and − directions, for example, are disposed on the operation screen of the teaching pendant 1300 in FIG. 16. Moreover, a central part of the operation screen of the teaching pendant 1300 is formed of a touch panel 1303. This touch panel 1303 is formed by disposing an operation panel on an LCD display unit, where the operation panel is designed to accept operation inputs such as tap (touch) and swipe (drag) operations. Using the touch panel 1303, it is possible to construct a user interface configured to display keyboards and the like on the LCD display unit and to allow an operator to directly operate such a display section, for example. The touch panel 1303 of the teaching pendant 1300 in FIG. 16 displays display outputs and operation buttons as indicated with reference signs 1304, 1305, 1306, 1307, and so forth. The user interface constructed by these display items on the touch panel 1303 in FIG. 16 will be explained in connection with robot control to be described later.

Figure 2:
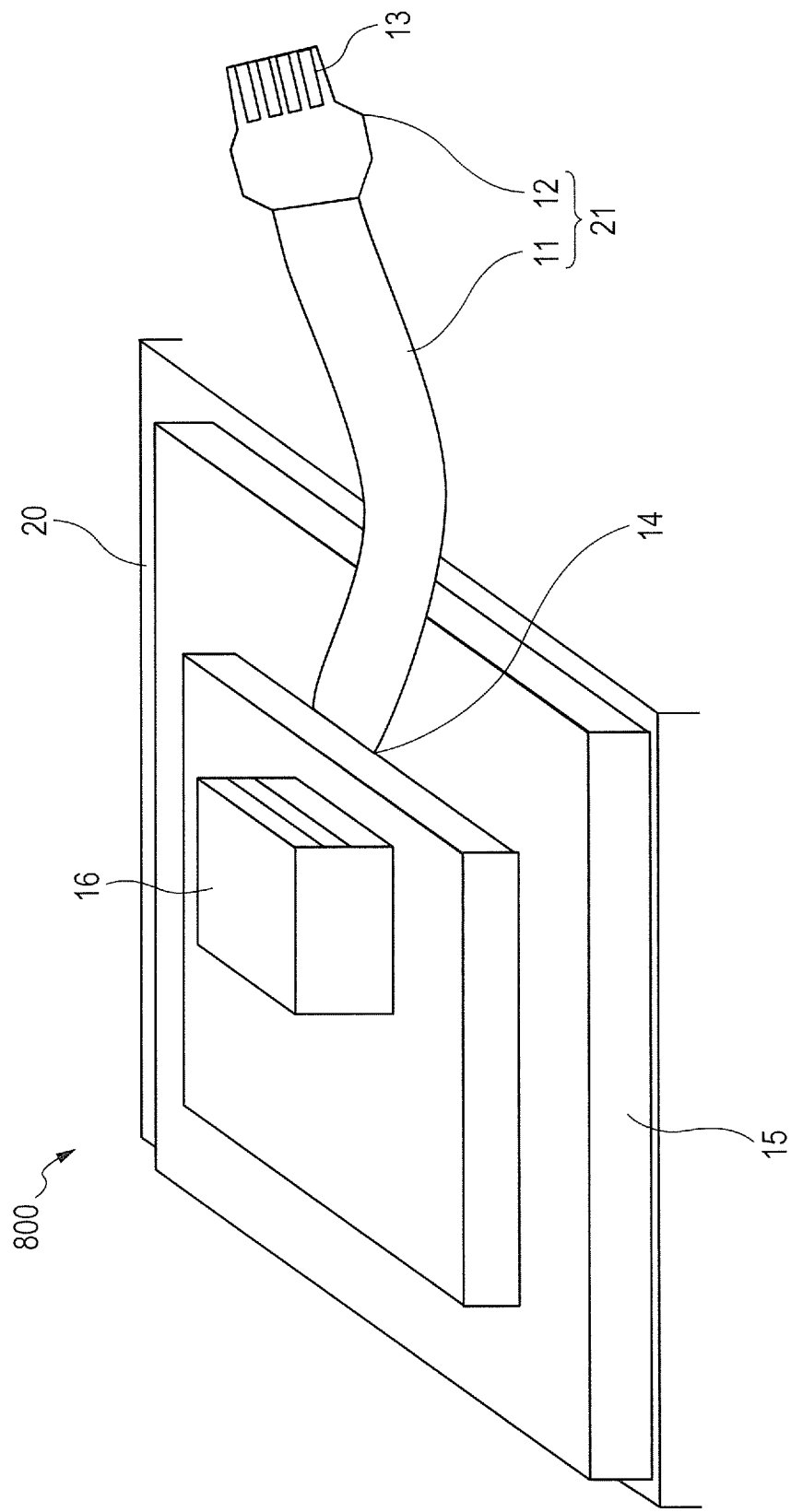
FIG. 2 is a perspective view showing a schematic configuration of a workpiece being a work target of the robot apparatus according to Example 1 of the present invention.

FIG. 2 shows an example of a workpiece 800 as a target for assembly (attachment) manipulation by a gripping device such as the robotic hand 302 of the robotic arm 301.

In the example in FIG. 2, the workpiece 800 being a work target includes a board 15, a connector-attached cable 21 with its base end portion 14 being attached to the board 15, and a connector 16. Although the connector-attached cable 21 is drawn out of the board 15 in this example, the connector-attached cable 21 may be drawn out of a different member (not shown) instead.

The connector-attached cable 21 includes a cable 11, and a connector 12 being a cable-side connector formed at a front end portion of the cable 11. In other words, a front end portion 13 in a longitudinal direction of the connector-attached cable 21 constitutes the connector 12. The cable 11 is made of a (flexible) flat cable, for instance.

Figure 3:
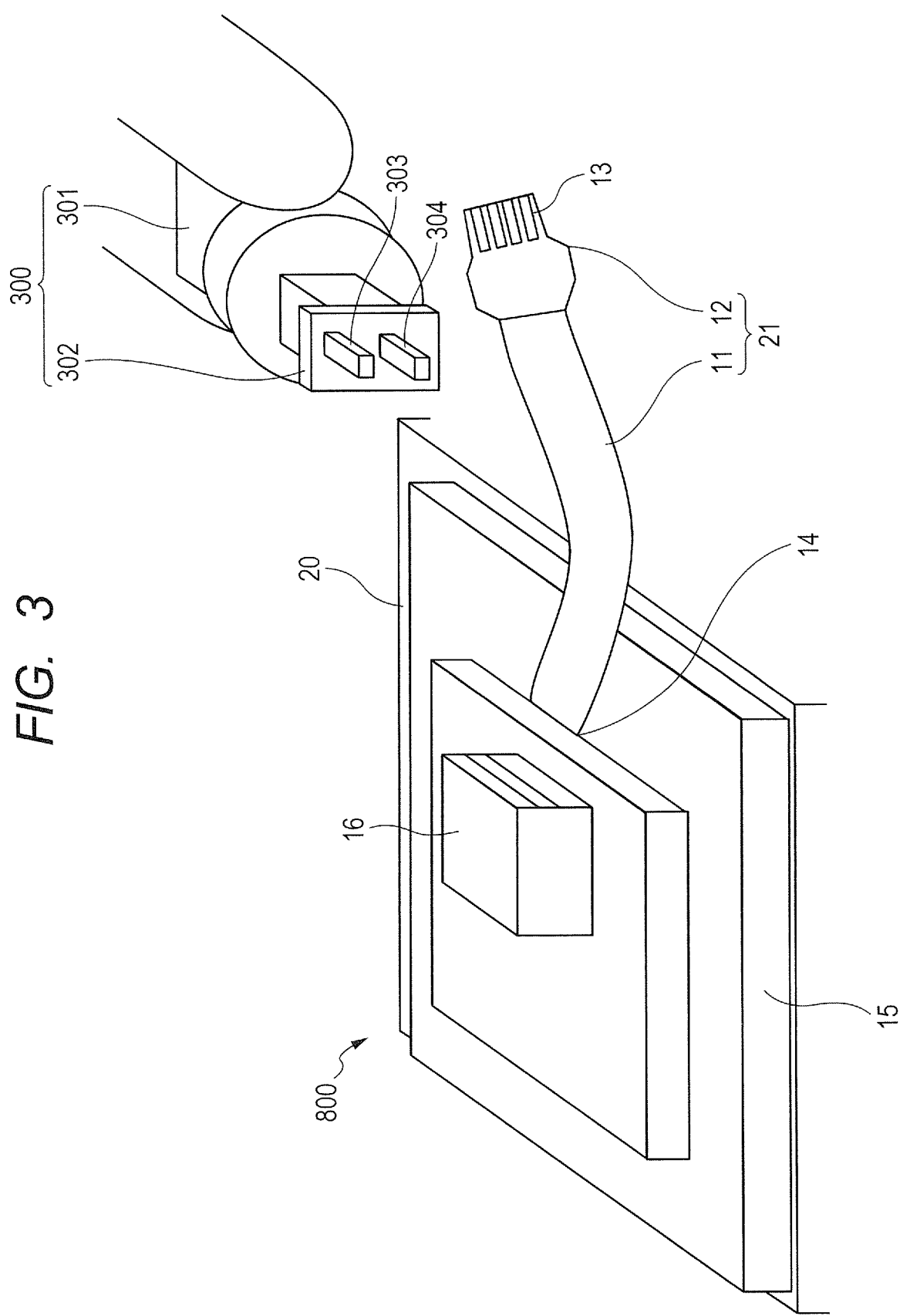
FIG. 3 is a perspective view showing a state of manipulation of a workpiece by a robotic hand of the robot apparatus according to Example 1 of the present invention.

FIG. 3 shows an example of work to manufacture an article by connecting the front end portion 13 in the longitudinal direction of the connector-attached cable 21 having the above-described configuration to the connector 16. For instance, the robotic hand 302 of the robotic arm 301 includes a pair of fingers 303 and 304 for a gripping operation, which are provided at a front end of the robotic hand 302.

Figure 4A:
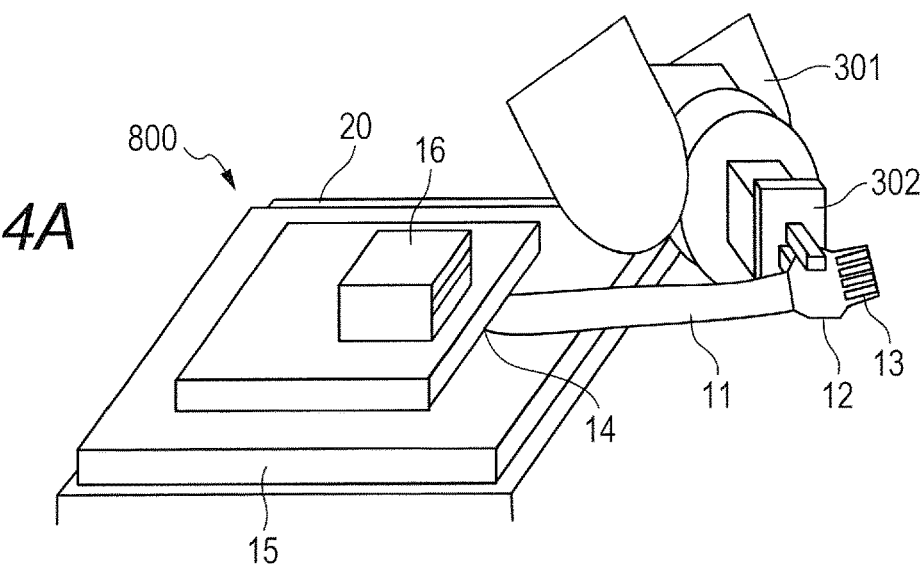
FIGS. 4A, 4B and 4C are perspective views showing states of manipulation of the workpiece by the robot apparatus according to Example 1 of the present invention.
Figure 4B:
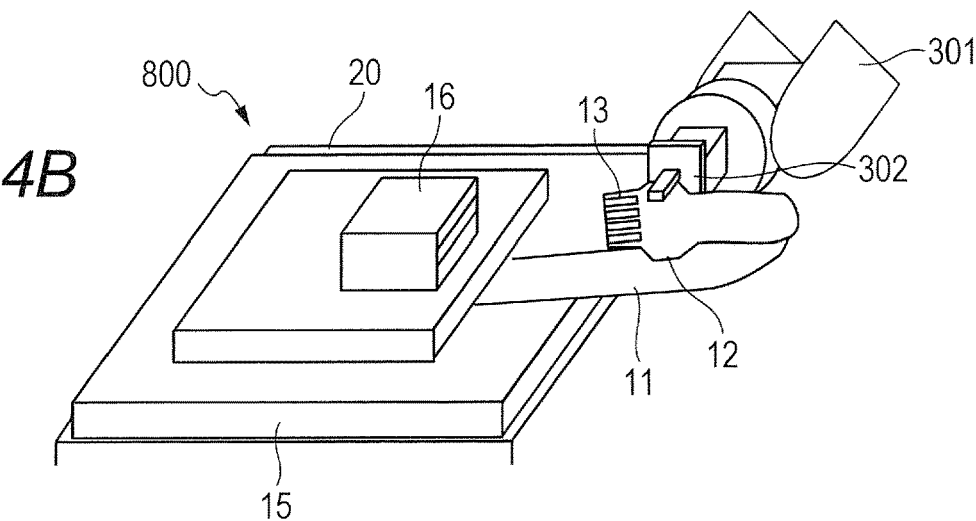
Figure 4C:
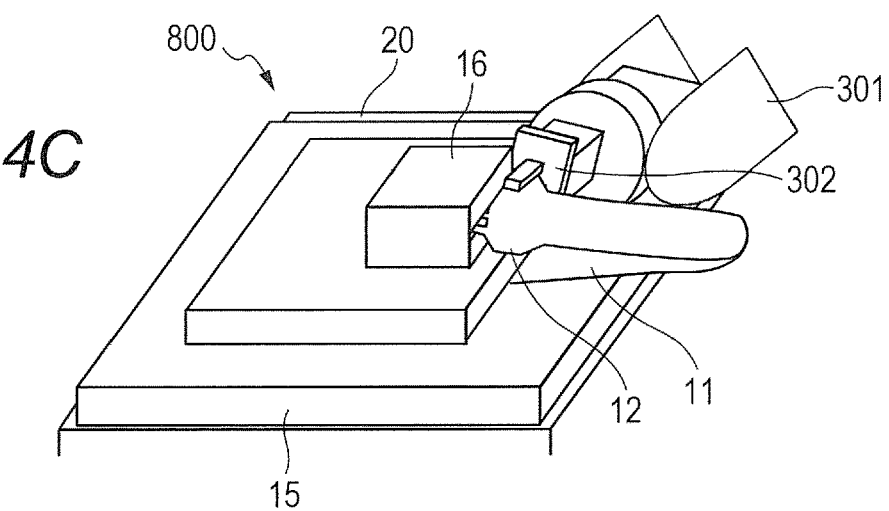

In the above-described configuration, the control device 200 performs manipulation to grip the connector 12 on the connector-attached cable 21 side with the fingers 303 and 304 of the robotic hand 302, and then to connect the connector 12 to the connector 16 on the board 15 side as illustrated in FIGS. 4A to 4C, for example.

First, as shown in FIG. 4A, the front end portion 13 in the longitudinal direction of the connector-attached cable 21 is gripped with the fingers 303 and 304 of the robotic hand 302. At this time, manipulation as shown in FIG. 4B is required if the cable 11 formed of a flat cable or the like assumes a straight orientation (shape) as illustrated in FIG. 4A. In this case, the control device 200 controls the robotic arm 301 in such a way as to turn the orientation of the connector 12 (the front end portion of the connector-attached cable 21) gripped with the robotic hand 302 as shown in FIG. 4B, thereby directing the connector 12 toward the connector 16.

Thereafter, the connector 12 is brought into engagement with (fitted into, inserted into, etc.) the connector 16 as shown in FIG. 4C. At this time, the position and orientation of the connector 12 (the front end portion 13) need to be controlled when bringing the connectors 12 and 16 into engagement such that a projection and a recess of the connectors are aligned with each other.

Figure 5:
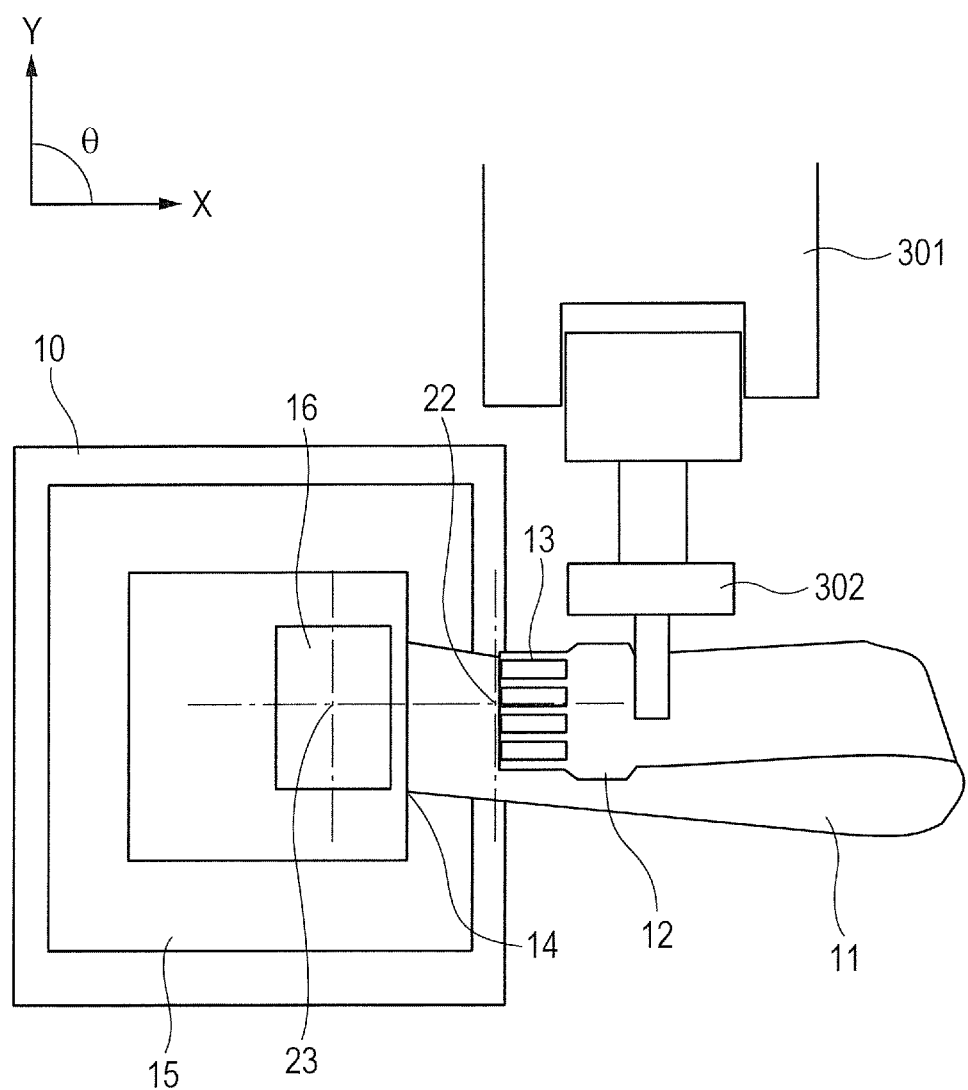
FIG. 5 is a top plan view showing a state of handling a connector and a flexible cable by the robotic hand of the robot apparatus according to Example 1 of the present invention.

Specifically, as shown in FIG. 5, the position and the orientation of the connector 12 (the front end portion 13) need to be aligned with the direction to insert the connector 16. To be more specific, the center 23 (the central axis) of the connector 16 needs to be aligned with the center 22 (the center axis) of the front end portion 13 in the longitudinal direction of the connector-attached cable 21. Note that one of XY-coordinate systems used in assembly control conducted by the robot apparatus 300 is shown on an upper left part in FIG. 5. This XY-coordinate system is a global coordinate system that is substantially parallel to a plane on which the board 15 is disposed, for example.

Figure 6A:
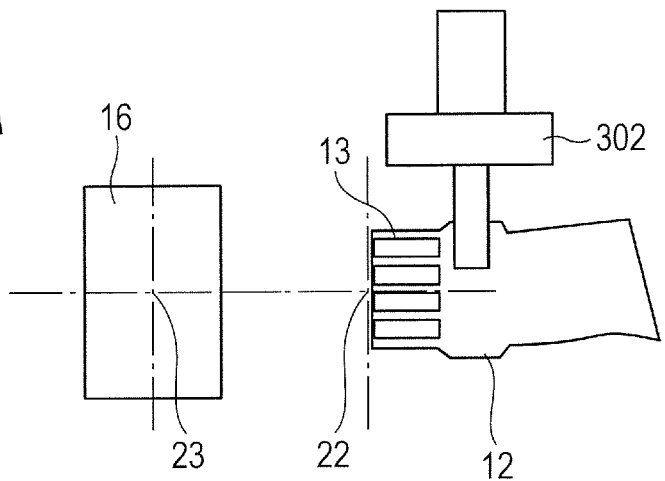
FIGS. 6A, 6B and 6C are top plan views showing various possible positional relations between the connector and the flexible cable in FIG. 5.
Figure 6B:
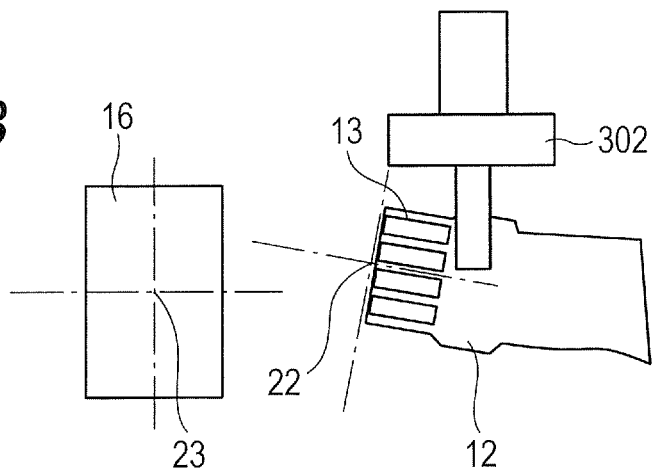
Figure 6C:
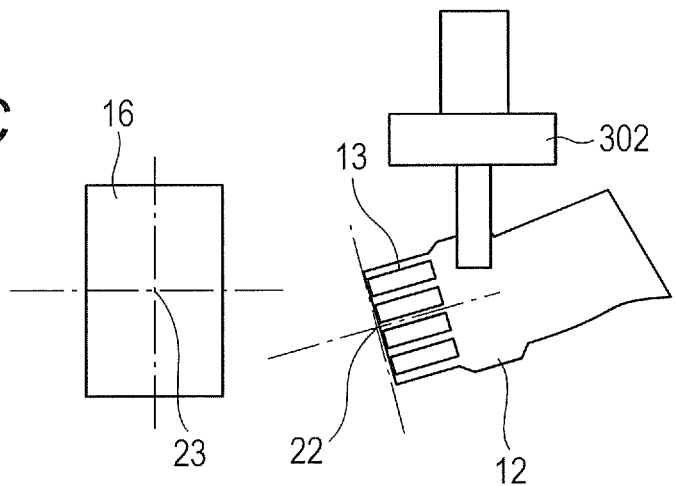

Preferably, when the position (the orientation) of the connector 12 is aligned with the connector 16 as shown in FIG. 5, the position and the orientation of the gripped object (the connector 12 (the front end portion 13 of the connector-attached cable 21)) are corrected by applying a measurement result obtained by using the measurement device such as the visual sensor 500. For example, when the gripped object (the front end portion 13 of the connector-attached cable 21) is gripped with the robot, the position and the orientation of the gripped object (the front end portion 13 of the connector-attached cable 21) do not always establish an ideal positional relation with the connector 16 as shown in FIG. 6A. In other words, when the gripped object (the front end portion 13 of the connector-attached cable 21) is gripped with the robotic hand 302, the gripped position (the gripped orientation) thereof may vary as shown in FIGS. 6B and 6C. Here, though only the inclination of the gripped object (the front end portion 13 of the connector-attached cable 21) is mainly illustrated, a region to be gripped with the fingers 303 and 304 of the robotic hand 302 may be displaced in another case. Those errors in the gripped position (the gripped orientation) are caused by the effect of individual differences including a manufacturing error of the connector-attached cable 21, a position of attachment, bending and torsion of the cable 11, and so forth.

Figure 7:
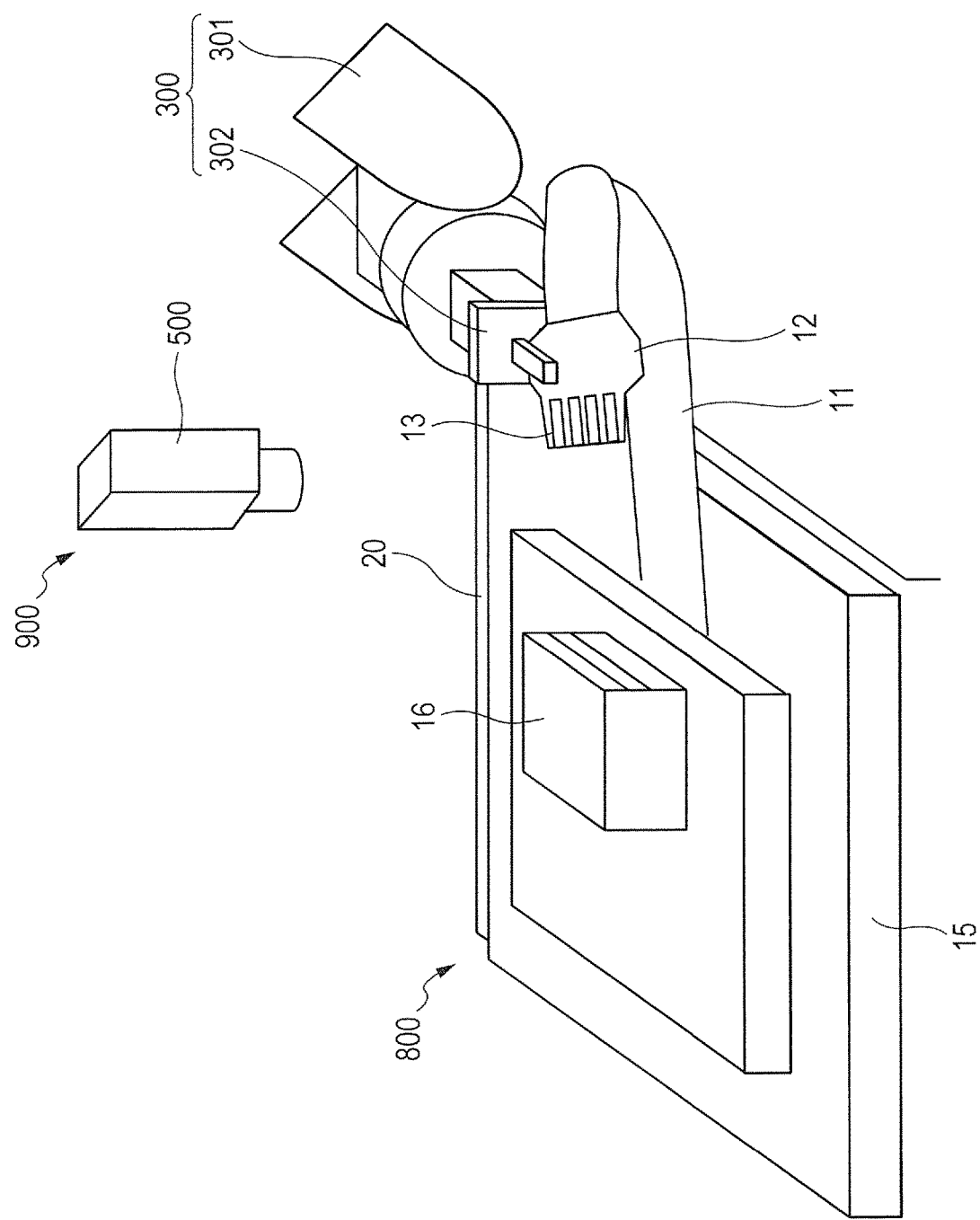
FIG. 7 is a perspective view showing a state of measurement of the robotic hand of the robot apparatus according to Example 1 of the present invention and the workpiece by using a visual sensor.

FIG. 7 shows a state of shooting an image by using the visual sensor 500 while gripping the connector 12 with the robotic hand 302 at the position and the orientation illustrated in FIG. 4B, for example. Meanwhile, FIGS. 11A to 11D show states of activating position-orientation correction processing on the gripped object (the connector 12 as well as the front end portion 13 of the connector-attached cable 21) by using measurement (shooting) results of the visual sensor 500 at the time of performing a connector attachment operation equivalent to the illustration in FIGS. 4A to 4C.

Figure 11A:
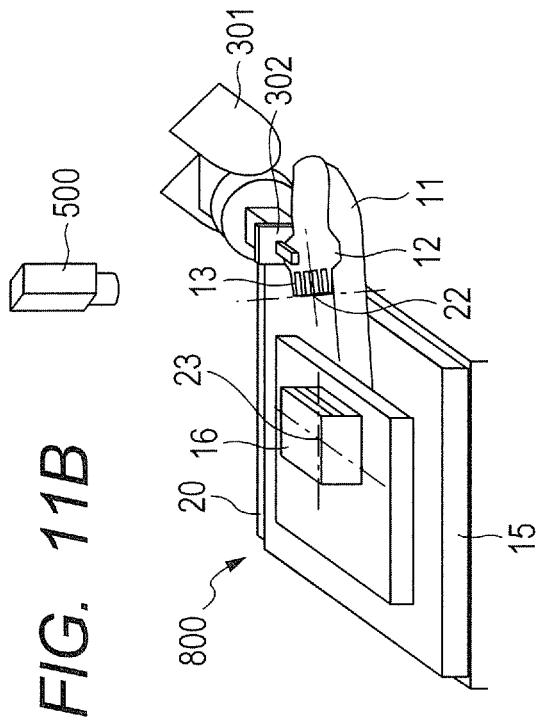
FIGS. 11A, 11B, 11C and 11D are perspective views showing states of manipulation of the workpiece inclusive of corrective actions by using the visual sensor in the robot apparatus according to Example 1 of the present invention.
Figure 11B:
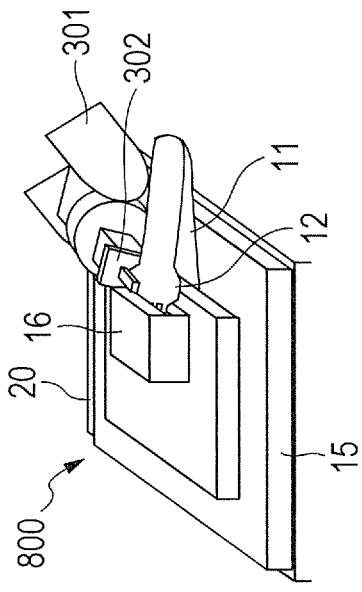

FIGS. 11A and 11B correspond to the states illustrated in FIGS. 4A and 4B, respectively. Here, as shown in FIG. 11B in particular, the center 22 (the central axis) of the connector 12, that is, the front end portion 13 in the longitudinal direction of the connector-attached cable 21, is tilted with respect to the center 23 (the central axis) of the connector 16, and these axes are not aligned (do not coincide) with each other. In this example, the gripped connector 12 is tilted in a horizontal (XY) plane with respect to the fingers 303 and 304 of the robotic hand 302, and a front end of the connector 12 is tilted downward. Meanwhile, there may also be a case where there are position-orientation errors of the robotic hand 302 and the connector 12 in a vertical (Z-axis) direction aside from the foregoing.

In FIG. 11B, the control device 200 can calculate the position and the orientation of the connector 12 gripped with the robotic hand 302, such as the position and the orientation of the center 22, by using an image shot with the visual sensor 500. Then, the control device 200 can correct subsequent control of the position and the orientation of the robotic arm 301 at the time of bringing both of the connectors 12 and 16 into engagement as illustrated in FIGS. 11C and 11D, by using a result of analysis of the image shot with the visual sensor 500.

Figure 11C:
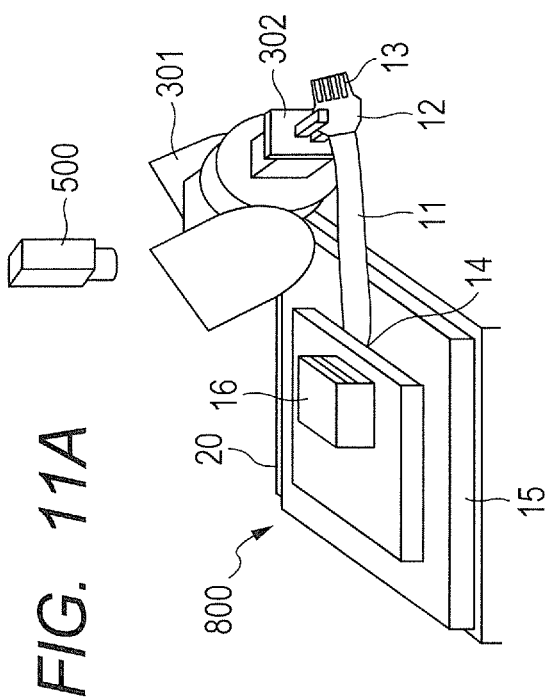
Figure 11D:
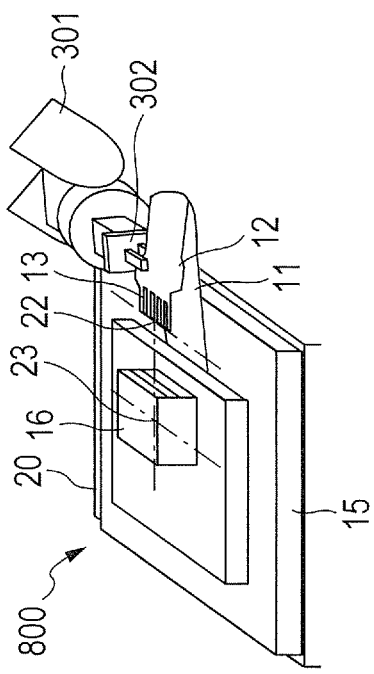

For instance, in FIG. 11C, the position and the orientation of the robotic arm 301 are corrected in such a way as to substantially align the center 23 of the connector 16 with the center 22 of the connector 12. Thereafter, as shown in FIG. 11D, an attachment step, that is, a step of connecting the connectors 12 and 16 is completed by pushing the connector 12 into the connector 16 with the robotic arm 301.

Here, the above-mentioned position-orientation control error may occur in the course of actions of the robotic arm 301 (FIGS. 11C and 11D) at the time of bringing both of the connectors 12 and 16 into engagement as corrected by the control device 200 while using the result of analysis of the image shot with the visual sensor 500. For example, depending on the position and the orientation of the robotic arm 301 at the time of shooting (measurement) with the visual sensor 500, it is likely that the correction takes place in such a way as to reverse rotation (to cause reverse rotation) of a certain one of the joints (J1 to J6) in the course of a corrected action of the robotic arm 301.

Timing for performing the shooting (the measurement) with the visual sensor 500 can be determined based on an operation conducted by an operator with the teaching pendant 1300, for example. Alternatively, the control device 200 may automatically determine the timing while using a specific operation of the teaching pendant 1300 as a trigger.

Nonetheless, in any of the foregoing shooting control modes, the above-mentioned position-orientation control error may occur when the correction takes place in such a way as to reverse the rotation (to cause the reverse rotation) of the certain one of the joints (J1 to J6) in the robotic arm 301 in the course of the shooting (the measurement) with the visual sensor 500. As described previously, the position-orientation control error is attributed to a backlash of the drive (transmission) system of a certain one of the joints (J1 to J6) caused by the reversal of the rotation (the reverse rotation) of the certain joint. In case of occurrence of the position-orientation control error attributed to the backlash, an operation to connect the connectors 12 and 16 may fail or a forcible connector inserting operation may take place and end up in failure to establish a normal connection status.

Accordingly, this Example 1 provides a configuration to enable a corrective action in the correction of the position-orientation control of the robotic arm 301 to be conducted in response to the shooting (the measurement) with the visual sensor 500, with which the occurrence of the position-orientation control error attributed to the reversal of the rotation (the reverse rotation) of the certain one of the joints (J1 to J6) is avoidable.

Here, the correction of the position-orientation control of the robotic arm 301 to be conducted in response to the shooting (the measurement) with the visual sensor 500 is naturally conducted in terms of the position and the orientation of the gripped object (as well as the arm) when the shooting (the measurement) with the visual sensor 500 takes place. Accordingly, the timing of the shooting (the measurement) with the visual sensor 500 and the position and the orientation of the gripped object (and the arm) at that timing are controlled in this Example 1. Thus, it is possible to create such a corrective action that can avoid the occurrence of the reversal of the rotation (the reverse rotation) of each of the joints (J1 to J6) in the corrective action to be executed in the correction thereafter.

Specifically, in this Example 1, the robot apparatus 300 includes the robotic arm 301 provided with the gripping device (the robotic hand 302) capable of changing its position or orientation by using the joints. In addition, the robot apparatus 300 includes the measurement device (the visual sensor 500) which measures the position or the orientation at a measurement teaching point of the gripped object (the connector 12) gripped with the gripping device (the robotic hand 302).

The control device 200 of the robot apparatus 300 controls the position or the orientation when the gripped object (the connector 12) is attached to the attachment target object (the connector 16) being the target for attachment at an attachment teaching point that is corrected based on the measurement result by the measurement device. Moreover, in the control method of this Example 1, the control device 200 executes a measurement teaching point determination process of determining the measurement teaching point such that the driving direction of each of the joints (J1 to J6) from the measurement teaching point to the attachment teaching point mentioned above is set to the definite driving direction.

Meanwhile, the control device 200 of the robot apparatus 300 acquires a pre-measurement teaching point (a pre-measurement teaching point determination process) where the robotic arm 301 causes the gripped object (the connector 12) gripped with the robotic hand 302 to pass through in advance of the measurement teaching point. In the pre-measurement teaching point determination process, the pre-measurement teaching point is determined such that the driving direction of each of the joints from the pre-measurement teaching point to the measurement teaching point where the measurement with the visual sensor 500 takes place is set to the definite driving direction. In this Example 1, the gripped object is moved to the measurement teaching point via the pre-measurement teaching point determined in the pre-measurement teaching point determination process.

The control to cause the robot apparatus 300 to determine the measurement teaching point (the teaching point at which the measurement with the visual sensor 500 takes place) such that it is possible to create the corrective action which can avoid the occurrence of the reversal of the rotation (the reverse rotation) of each of the joints (J1 to J6) of the robotic arm 301 as mentioned above will be described below in further detail.

Workpieces 800, or more specifically, the workpieces 800 each provided with the connector-attached cable 21, the board 15 to which the connector-attached cable 21 is attached, and the connector 16 serving as a connection target to the connector 12, are sequentially supplied onto a work table 20 by using a not-illustrated supply-conveyance unit.

Each of these workpieces 800 is roughly positioned on the work table 20. Accordingly, it is possible to achieve substantially constant control of a control position of the base end portion 14 (a base) of the connector-attached cable 21 (the cable 11) as well as a control position in the vicinity thereof. However, a variation in position is gradually increased toward the front end portion 13 of the connector-attached cable 21 due to the effects of bending, torsion and the like of the cable 11. For this reason, even when the board 15 of each workpiece 800 is positioned on the work table 20, the position and the orientation of the front end portion 13 of the connector-attached cable 21 before being gripped are likely to vary over relatively wide ranges as shown in FIGS. 6B and 6C. In consideration of such variations, the robotic hand 302 is used to pinch an intermediate region near the base end portion 14 of the connector-attached cable 21. Then, a pinching amount of the robotic hand 302 is thought to be set with such a clearance that enables the robotic hand 302 in the pinching (gripping) state to move to the connector 12 of the connector-attached cable 21 while sliding thereon.

Meanwhile, in order to confine the corrective action after the measurement with the visual sensor 500 to a certain movable range, reduction in the chance of causing the reverse rotation of the certain one of the joints (J1 to J6) in the course of the corrected action after the measurement is taken into account in particular. For example, a possible option is to provide a confinement unit that confines error ranges of the position and the orientation of the gripped object (the connector 12), which is in the state of being gripped with the gripping device (the robotic hand 302), with respect to the gripping device to predetermined ranges.

Figure 8:
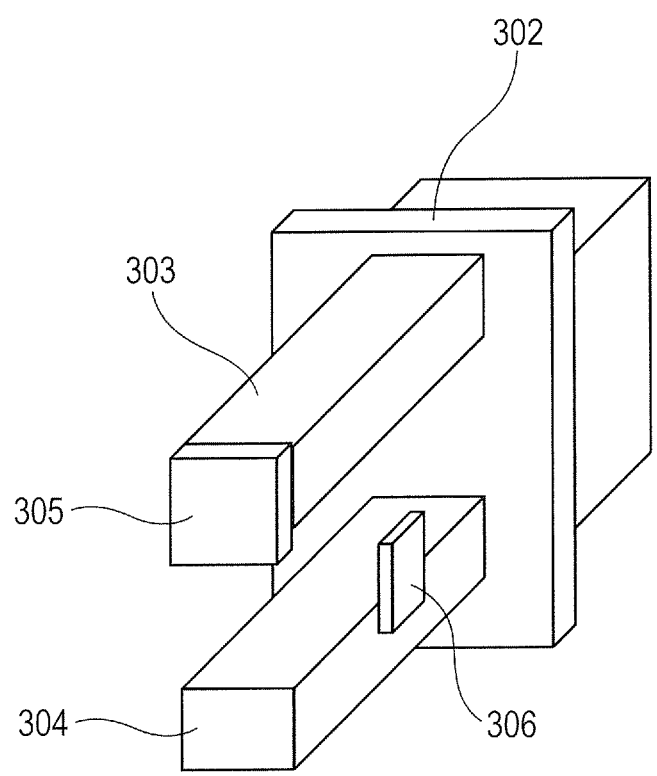
FIG. 8 is a perspective view showing a configuration example of position-orientation confinement members to be provided on the robotic hand of the robot apparatus according to Example 1 of the present invention.

For instance, it is possible to use the confinement unit as shown in FIG. 8 at the time of gripping with the fingers 303 and 304 of the robotic hand 302 such that the variations in the possible position and the possible orientation of the front end portion 13 of the connector-attached cable 21 remain within certain error ranges.

In the configuration in FIG. 8, the fingers 303 and 304 of the robotic hand 302 are provided with confinement members at such positions and orientations as represented by projections 305 and 306. Thus, it is possible to suppress the variations in the position and the orientation of the gripped object gripped with the fingers 303 and 304, such as the connector 12 and the front end portion 13 of the connector-attached cable 21, with respect to the fingers (as well as the robotic arm 301 and the entire robot). By providing the confinement unit as shown in FIG. 8, it is possible to confine the displacement of the front end portion 13 from the robot apparatus 300 at the time of insertion of the front end portion 13 within a predetermined error range in advance, and thus to reduce a control burden for the robot control to be described later.

In the meantime, it is preferable to provide the robotic hand 302 with such a structure that can keep the connector 12 (or part of the connector-attached cable 21) pinched between the fingers 303 and 304 from sliding during the action to connect the connector 12 to the connector 16. A possible option, for example, is to form opposed surfaces of the fingers 303 and 304 by using a material having a high friction coefficient such as a rubber material. This makes it possible to prevent or suppress the misalignment of the relative positions and the relative orientations between the front end portion 13 of the connector-attached cable 21 and the fingers 303 and 304 during the action of the robotic arm 301 to change the orientations of the fingers 303 and 304.

Note that the visual sensor 500 naturally has a measurement range (such as an angle of view) to allow the visual sensor 500 to shoot (measure) the connector 12 of the connector-attached cable 21 and the connector 16 of the robotic hand 302 at the same time.

In order to determine the measurement teaching point with the visual sensor 500 so as to enable the creation of the corrective action that can avoid the occurrence of the reversal of the rotation (the reverse rotation) of each of the joints (J1 to J6) of the robotic arm 301, control functions of the control device 200 are thought to be constructed by respective functions as shown in FIG. 1, for example. In FIG. 1, the robot apparatus 300 provided with the robotic arm 301 and the robotic hand 302 in FIG. 17 are illustrated as a single block. The functions of respective control blocks in FIG. 1 are formed of the storage units (the ROM 1202 and the RAM 1203) and operating functions (of the CPU 1201) of the control device 200 except for a hardware configuration (W1) thereof.

The robot control of this Example 1 performs the control to correct the relative positions and the relative orientations between the attachment target object (the connector 16) and the object (the connector 12) gripped with the robotic hand 302 to be moved via the pre-measurement teaching point, the measurement teaching point, and the attachment teaching point.

Here, the term "teaching point" represents a physical amount and control information corresponding to the position and the orientation of the entire robotic arm 301 inclusive of the robotic hand 302. Such a teaching point may be expressed, for example, by the position and the orientation of a reference region (a reference point) of the robot such as the center (the central axis) of a flange surface where the robotic hand 302 is attached to the robotic arm 301. In this context, the above-mentioned expression "moved via the teaching point" means that the aforementioned reference region (the reference point) of the robot undergoes the position and the orientation of each teaching point. Meanwhile, "teaching" manipulation by using the teaching pendant 1300 adopts a manipulation method of moving the position and the orientation of the reference region (the reference point) mentioned above by way of a manipulation unit such as a jog button (details of which are not illustrated) disposed on the teaching pendant 1300 shown in FIG. 17.

When the reference region (the reference point) of the robot takes a position and an orientation corresponding to a certain teaching point, the position and the orientation are determined based on an axis value (which is a rotational angle in the case of a rotary joint) of each of the joints (J1 to J6). For example, the control device 200 conducts so-called kinematics calculation starting from the axis value of each of the joints (J1 to J6), thereby acquiring the corresponding teaching point, that is, the position and the orientation occupied by the reference region (the reference point) of the robot. On the other hand, the teaching point being a control target, that is, the axis value of each of the joints (J1 to J6) for achieving the position and the orientation to be occupied by the reference region (the reference point) of the robot, is acquired by conducting so-called inverse kinematics calculation starting from the teaching point. Note that a certain teaching point is uniquely determined by conducting the kinematics calculation based on the axis value of each of the joints (J1 to J6). In contrast, in the robotic arm adopting the vertically articulated structure, the number of combinations of the axis values of the respective joints (J1 to J6) to be obtained by the inverse kinematics calculation so as to achieve the certain teaching point is not necessarily limited only to one.

The control method of this Example 1 is formed from the functions illustrated in blocks that are denoted by reference signs W1 to W10 as shown in FIG. 1, for example.

In FIG. 1, reference sign W1 corresponds to a movement unit that moves the gripped object (such as the connector 12) gripped with the robot apparatus 300. The movement unit W1 is formed from drive sources (such as servo motors) for the respective joints (J1 to J6) of the robotic arm 301 and for the fingers 303 and 304 of the robotic hand 302, for example.

Meanwhile, reference sign W2 denotes the measurement device that measures one or both of the position and the orientation of the gripped object (the connector 12). In this Example 1, the measurement device W2 corresponds to the visual sensor 500.

In the meantime, reference sign W3 denotes a unit to input maximum and minimum error ranges of the relative position and the relative orientation of the gripped object (the connector 12) in the gripped state with respect to the robotic hand 302. Although the expression "input" is used herein for the sake of convenience, the unit W3 may for instance be table data of specification information prepared in the ROM 1202 and the like. The unit W3 corresponds to step S100 in FIG. 9 to be described later. Here, it is also possible to dispose the confinement unit such as the projections 305 and 306 in FIG. 8 as described previously so as to confine the relative position and the relative orientation of the gripped object (the connector 12) in the gripped state with respect to the robotic hand 302. In this case, the maximum and minimum error ranges of the relative position and the relative orientation of the gripped object (the connector 12) in the gripped state with respect to the robotic hand 302 can be calculated in advance based on physical dimensions of and shape information on the confinement unit such as the projections 305 and 306 in FIG. 8. Then, the maximum and minimum error ranges of the relative position and the relative orientation of the gripped object (the connector 12) in the gripped state with respect to the robotic hand 302 thus obtained are stored in the ROM 1202 and the like.

By providing the confinement unit to confine the maximum and minimum error ranges of the relative position and the relative orientation of the gripped object (the connector 12) in the gripped state with respect to the robotic hand 302 as shown in FIG. 8, it is possible to reduce an amount of calculation by the control device 200 at the time of acquisition of the corrected movable range to be described later.

Meanwhile, reference sign W4 denotes a unit to acquire a teaching point (FIG. 11C, for example) used to move the robotic arm 301, the measurement teaching point (FIG. 11B, for example), and a via-point (FIG. 11A, for example) as the pre-measurement teaching point when there is no position (orientation) error of the gripped object. The unit W4 can be realized, for example, by a teaching operation to teach the respective teaching points mentioned above to be conducted by the operator using the teaching pendant 1300. However, the respective teaching points mentioned above may be stored in the ROM 1202 as setting information in advance, depending on ranges of specifications regarding work accuracy of the workpiece 800, conveyance (supply) accuracy of the workpiece 800, control accuracy of the robotic arm 301, and so forth. The unit W4 corresponds to step S200 in FIG. 9 to be described later.

In the meantime, reference sign W5 denotes a unit to obtain the position and the orientation to be taken by the robotic arm 301 after the corrective action at the attachment teaching point (FIG. 11C, for example) depending on the maximum and minimum error ranges of the position and the orientation of the gripped object (the connector 12) acquired by the unit W3.

Meanwhile, reference sign W6 denotes a unit to obtain the axis value of each of the joints (J1 to J6) of the robotic arm 301 at a specific position and a specific orientation (the teaching point) of the robotic arm 301. The unit W6 can be realized, for example, by causing the CPU 1201 of the control device 200 to perform calculation (the inverse kinematic calculation) of the axis value (which is the rotational angle in the case of the rotary joint) of each of the joints (J1 to J6) based on the specific position and the specific orientation (the teaching point) of the robotic arm 301. The unit W6 corresponds to step S400 in FIG. 9 to be described later.

In the meantime, reference sign W7 denotes a unit to obtain the possible corrected movable range of the axis value (which is the rotational angle in the case of the rotary joint) in terms of each of the joints (J1 to J6) of the robotic arm 301 (a corrected movable range acquisition process). The corrected movable range corresponds to a range of possible axis values applicable to the certain one of the joints (J1 to J6) on the way to the teaching point (FIG. 11C) at a destination of the robotic arm 301 when there is no error, the range corresponding to the maximum and minimum error ranges (the unit W3) of the position and the orientation of the gripped object (the connector 12). In this unit W7, the CPU 1201 of the control device 200 performs the calculation based on the above-mentioned maximum and minimum error ranges and on the teaching point (FIG. 11C) at the destination of the robotic arm 301 when there is no error. The unit W7 corresponds to step S600 in FIG. 9 to be described later.

At this time, if the above-mentioned maximum and minimum error ranges and the teaching point (FIG. 11C) at the destination of the robotic arm 301 when there is no error are known, for example, then the CPU 1201 can acquire a list of teaching points located on a trajectory to move the robot to the teaching point. The list of teaching points thus acquired can be formed in a linked list format, for example, and stored in the RAM 1203 as with the case of storing a binary tree and graph data. The CPU 1201 can obtain the possible axis value of a certain one of the joints (J1 to J6) corresponding to each teaching point by the inverse kinematics calculation of the unit W6 by referring to the list of teaching points directed to the teaching point (FIG. 11C) at the destination of the robotic arm 301 when there is no error. Then, the range of possible axis values applicable to the certain one of the joints (J1 to J6) during the action to be directed to the teaching point (FIG. 11C) at the destination of the robotic arm 301 when there is no error, is acquired as the corrected movable range of the certain joint. However, the corrected movable range thus acquired is supposed to realize the trajectory of the teaching points of the robotic arm 301 corresponding thereto only with the rotary drive of the certain joint in one direction. If the certain joint causes the reverse rotation on a certain trajectory of the teaching points as a result of the inverse kinematics calculation (W6), the certain trajectory of the teaching points in the list of the teaching points is to be excluded from the target to be acquired as the corrected movable range.

Meanwhile, reference sign W8 denotes a determination unit to determine whether or not the axis value of each of the joints (J1 to J6) corresponding to a certain via-point, such as the pre-measurement teaching point, falls within the corrected movable range (W7). The determination unit W8 corresponds to steps S700 and S800 in FIG. 9 to be described later.

In the meantime, reference sign W9 corresponds to a control function applicable to the case (W8) where the axis value of each of the joints (J1 to J6) corresponding to a certain via-point such as the pre-measurement teaching point falls within the corrected movable range (W7). The unit W9 represents a control unit which provides a new teaching point in such a range where each axis value falls out of the corrected movable range during the movement from a pre-measurement teaching point to the attachment teaching point (FIG. 11C), and determines this teaching point as the pre-measurement teaching point immediately preceding to the measurement teaching point. The control unit W9 corresponds to steps S1000 and S1100 in FIG. 9 to be described later, and the "via-point" in these steps corresponds to the above-mentioned "pre-measurement point immediately preceding to the measurement teaching point".

Meanwhile, reference sign W10 denotes a unit to provide another new teaching point in such a range where each axis value falls out of the corrected movable range during the movement from the pre-measurement teaching point (W9) to the attachment teaching point (FIG. 11C), and to define this teaching point as the measurement teaching point to be measured with the visual sensor 500. The unit W10 corresponds to step S1200 in FIG. 9 to be described later.

Figure 9:
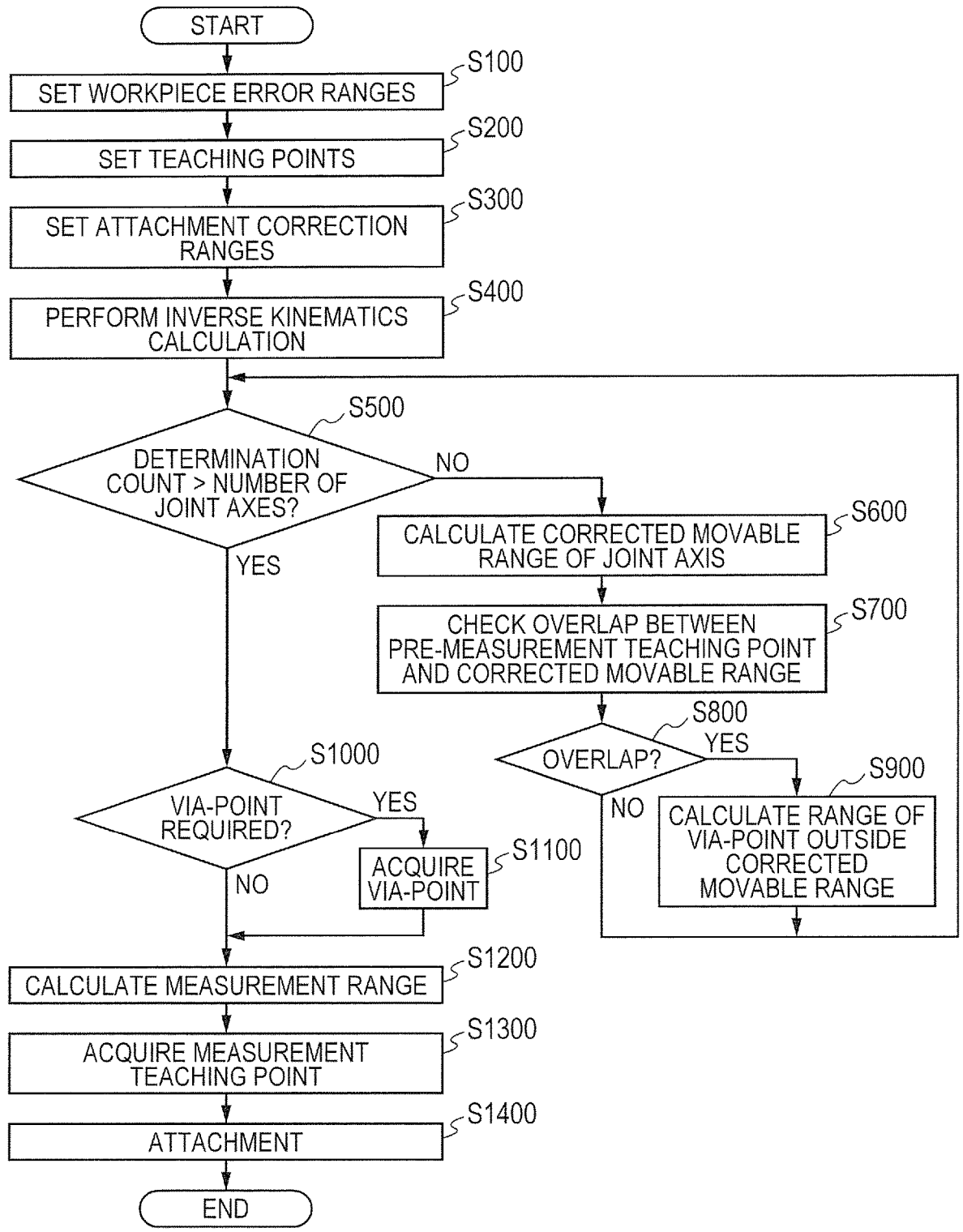
FIG. 9 is a flowchart showing robot control procedures to be conducted by the robot apparatus of Example 1.

FIG. 9 shows an example of robot control procedures for realizing the respective control functions (W1 to W10) in FIG. 1 described above in this Example 1. The control procedures in FIG. 9 can be stored in the ROM 1202 or the external storage device 1204 as a control program executable by the control device 200. Now, the control procedures in FIG. 9 will be described below in detail. Here, it is to be noted that the workpiece 800 to be handled by the robotic arm 301 is assumed to have the configuration as illustrated in FIGS. 2 to 7. Moreover, the confinement unit configured to suppress the variations (the error ranges) of the position and the orientation of the gripped object (the connector 12) are preferably disposed on the robotic hand 302 as shown in FIG. 8.

In step S100 in FIG. 9, the CPU 1201 of the control device 200 sets the error ranges (FIGS. 5, and 6A to 6C) of the position and the orientation of the center 22 of the front end portion 13 of the connector-attached cable 21 with respect to the center 23 of the connector 16. The error ranges of the workpiece 800 are values derived from a product error, attachment accuracy, positioning accuracy, and the like of the connector-attached cable 21, which are stored in the ROM 1202 and the like in advance. The CPU 1201 reads the values therefrom. As shown in FIG. 10A, for example, the error ranges of the workpiece 800 are expressed by coordinate information in terms of three axes of XYZ axes and information on amounts of rotation around the three axes, namely, X, Y, Z (position information 1401: by the millimeter), and rX, rY, rZ (orientation information 1402: by the degrees (of the angle)). Here, when the confinement unit is disposed on the robotic hand 302 as shown in FIG. 8, it is possible to perform confinement so as to eliminate the occurrence of the error around one axis or the errors around two axes substantially on the +(or −) side. For this reason, when the confinement unit is provided as shown in FIG. 8, the error ranges that are confined corresponding to the confinement unit are stored in the ROM 1202, and values in those ranges are put into use.

Next, the teaching points to let the robotic arm 301 pass (pass through) in the manipulation to attach the connectors 12 and 16 are set in step S200. The setting of the teaching points is either automatically performed by the CPU 1201 using design information on the workpiece 800 or performed by manipulation of the teaching pendant 1300 by the operator. Teaching points to be set at this stage include the following two types of teaching points. The first teaching point represents the position and the orientation of the robotic arm 301 in the case where the centers 22 and 23 of the connectors 12 and 16 coincide with each other as shown in FIG. 11C, and a required correction amount is therefore zero. In the meantime, the other teaching point corresponds to the teaching point immediately preceding to the measurement teaching point to measure a relative position relation between the center 22 of the connector 12 and the center 23 of the connector 16 with the visual sensor 500 as shown in FIG. 11B, and this teaching point represents the position and the orientation of the robotic arm 301 shown in FIG. 11A, for example. Among these teaching points, the measurement teaching point is acquired by the robot control of this Example 1. In the meantime, the pre-measurement teaching point does not always have to represent the position and the orientation shown in FIG. 11A.

Next, in step S300, the CPU 1201 sets attachment correction ranges (FIG. 10B) corresponding to correction ranges of the position and the orientation to be carried out in an attachment operation to be described later based on the error ranges (FIG. 10A) of the position and the orientation of the workpiece 800 set in step S100. As shown in FIG. 10B, for example, position information 1403 and orientation information 1404 in the attachment correction ranges represents the error ranges (variation ranges of the gripped workpiece) of the position and the orientation in FIG. 10A, with positive and negative signs therein being inverted. Note that in order to facilitate the understanding, the values of the error ranges (FIG. 10A) and the values of the attachment correction ranges (FIG. 10B) correspond to one another based on the assumption that these ranges adopt the same coordinate system.

Next, in step S400, the inverse kinematics calculation is conducted in terms of all of the positions and the orientations (all the teaching points) of the robot that can be taken within the attachment correction ranges (MAX to MIN) in FIG. 10B which are obtained in step S300. Then, the axis value of each of the joints (J1 to J6) of the robotic arm 301 at each position and each orientation (each teaching point) is acquired. Here, the axis value of each of the joints (J1 to J6) at each of the teaching points may be acquired by searching the teaching points on a teaching point trajectory in a space corresponding to the attachment correction ranges (FIG. 10B) by using arbitrary step amount. In the search of the teaching points on the trajectory, however, if a certain one of the joints (J1 to J6) requires the reverse rotation at one of the teaching points on a certain trajectory, the certain trajectory is supposed to be excluded from the target for the search (subject to suspension of further search), and the search of a different trajectory is supposed to take place.

Subsequent step S500 corresponds to loop control for carrying out processing from steps S600 to S900 in terms of each of the joints (J1 to J6) of the robotic arm 301 (as many times as the number of the axes). In the case of the six-axis (six-joint) robotic arm 301 as shown in FIG. 17, the processing from steps S600 to S900 is carried out on each of the joints J1 to J6. In the following, a general expression "n" is used as an index to identify each of the joints J1 to J6 (where n is an integer from 1 to 6).

The corrected movable range J[n] of the axis value (which is the rotational angle in the case of the rotary joint) of the joint Jn (any of J1 to J6) being processed is calculated in the first step S600 of this loop. As shown in FIG. 10C, this corrected movable range J[n] (1405) is calculated as the range of the axis value of the joint Jn at the position and the orientation of the robotic arm 301, which can be taken within the correction ranges corresponding to the attachment correction ranges (FIG. 10B) obtained in step S400.

Note that two rows at the bottom in FIG. 10C represent maximum ("MAX") and minimum ("MIN") axis values of the corrected movable range J[n] of each joint (Jn). Meanwhile, rows located above the aforementioned rows represent axis values of each joint (Jn) corresponding to the respective teaching points constituting the searched teaching point trajectory.

For instance, in the example in FIG. 12A, the (maximum) movable range (defined as A, for example) of a certain joint (Jn) of the robot satisfies $-180°<A\leq 180°$. Here, regarding this joint (Jn), a range corresponding to the attachment correction range (FIG. 10B) calculated by the inverse kinematics calculation in step S400 is assumed to be R2 (from $\theta min$ to $\theta max$). In this case, the corrected movable range J[n] corresponding to the attachment correction range of the joint (Jn) is equivalent to the range R2, namely, $\theta min \leq J[n] \leq \theta max$.

Next, in step S700, the CPU 1201 checks overlap between the axis value of the joint (Jn) at the pre-measurement teaching point acquired in step S200 and the corrected movable range. Here, the corrected movable range J[n] of the joint (Jn) obtained in step S600 is assumed to fall within the range R2 in FIG. 12A, for example. In this case, the check processing in step S700 corresponds to processing to check whether or not the axis value of the joint (Jn) (acquired by the inverse kinematics calculation) and corresponding to the pre-measurement teaching point acquired in step S200 falls within (overlaps) the range R2 of the joint axis. Next, it is determined in step S800 whether or not there is the occurrence of the overlap in step S700, and step S900 is executed if there is the occurrence of the overlap. If there is no occurrence of the overlap in step S700, that is, when the axis value of the joint (Jn) (to be acquired by the inverse kinematics calculation and) corresponding to the pre-measurement teaching point falls out of the corrected movable range J[n], the loop processing of the relevant joint (Jn) is terminated (the processing returns to step S500).

In step S900, the CPU 1201 executes processing applicable to the case where the result in step S700 turns out that the axis value of the joint (Jn) at the pre-measurement teaching point falls within the corrected movable range J[n]. Here, a range Jt[n] of the via-point to be passed through as the new pre-measurement teaching point outside the corrected movable range J[n] is calculated in step S900. For example, when the corrected movable range J[n] of the joint (Jn) is equivalent to the range R2 as shown in FIG. 12A, the range Jt[n] of the via-point is defined as ranges outside the range R2, namely, $-180°<Jt[n]<\theta min$ and $\theta max<Jt[n] \leq 180°$. After step S900, the processing of the relevant joint (Jn) is terminated (the processing returns to step S500).

When the robotic arm 301 completes the processing from step S600 to step S900 in terms of all of the joints (J1 to J6) of the robotic arm 301, the processing proceeds to step S1000. In step S1000, it is determined whether or not there is the occurrence of the overlap in the determination concerning the pre-measurement teaching point in step S800. Step S1100 is executed when there is the occurrence of the overlap in step S800.

In step S1100, in terms of all of the joints (J1 to J6), the via-point in a via-point range (Jt[n]) satisfying the condition of being "outside the corrected movable range (R2 in FIG. 12A)" calculated in step S900 is acquired as the new pre-measurement teaching point. The processing to acquire the via-point satisfying this condition as the new pre-measurement teaching point is thought to be conducted by automatic calculation of the CPU 1201, for example. Here, the range outside the corrected movable range calculated in step S900 is assumed to be any of the above-mentioned ranges (R1 and R2) of $-180°<Jt[n]<\theta min$ and $\theta max<Jt[n] \leq 180°$, for example. In this case, the CPU 1201 is caused to select one of the via-points within any of the via-point ranges (R1 and R2) and to acquire the selected via-point as the new pre-measurement teaching point. At this time, however, the CPU 1201 is controlled so as not to acquire the via-point within any of the two via-point ranges (R1 and R2), which establishes an angular relation that causes the relevant joint Jn to enter the corrected movable range (R2 in FIG. 12A) in an opposite direction to the rotational direction of the joint Jn in the corrected movable range in the actual corrective action.

Alternatively, the processing to acquire the via-point as the new pre-measurement teaching point in step S1100 can also be carried out by teaching manipulation of the operator using the teaching pendant 1300. For example, the operator is caused to perform the teaching operation by using the teaching pendant 1300 so as to teach an arbitrary via-point (a teaching point). Then, the CPU 1201 determines whether or not the via-point (the teaching point) taught from the teaching pendant 1300 satisfies the condition of the above-mentioned via-point range (R1 or R2). In consequence, the CPU 1201 acquires the via-point (the teaching point) taught from the teaching pendant 1300 as the new pre-measurement teaching point when the condition of the above-mentioned via-point range (R1 or R2) is satisfied. Here, in the case of acquiring the pre-measurement teaching point satisfying the condition by the teaching operation of the operator using the teaching pendant 1300, it is possible to employ a user interface which is similar to the user interface (such as the one shown in FIG. 16) to be employed at the time of acquisition of the measurement teaching point to be described later.

Next, in step S1200, the CPU 1201 performs the calculation to acquire the measurement range. As shown in FIG. 12B, the measurement range means a range R4 between an axis value Jb[n] of a certain joint (Jn) corresponding to the pre-measurement teaching point acquired in step S1100 and the corrected movable range R2 of the certain joint (Jn). In step S1200, the CPU 1201 acquires this range R4 as a measurement range (R4).

Next, in step S1300, the position and the orientation of the robotic arm 301 at the time of performing the measurement with the visual sensor 500 in order to correct the operation to attach the connectors 12 and 16, that is, the measurement teaching point (FIG. 11B) is acquired. In this case, the measurement teaching point is acquired from within the measurement range (R4 in FIG. 12B) calculated in step S1200. The acquisition of the measurement teaching point is also thought to be conducted by automatic calculation of the CPU 1201, for example. For instance, the CPU 1201 is caused to select one of teaching points within the measurement range (R4) and to acquire the selected teaching point as the measurement teaching point.

Alternatively, the acquisition of the measurement teaching point in step S1300 can also be carried out by teaching manipulation of the operator using the teaching pendant 1300. In this case, the user interface as shown in FIG. 16 can be adopted to teaching pendant 1300 in order to acquire (teach) the measurement teaching point, for example.

An input device to allow the operator to input candidates for the measurement teaching point (or the pre-measurement teaching point) is arranged on the teaching pendant 1300 (the teaching device). In an operation system shown in FIG. 16, the input device is formed from the operating keys 1301 and 1302, and the touch panel 1303. In addition, an output device to output information on whether or not any of the candidates for the measurement teaching point (or the pre-measurement teaching point) inputted with the input device satisfies the above-described relation with the corrected movable range is arranged on the teaching pendant 1300 (the teaching device). In the operation system shown in FIG. 16, the output device is formed from (a display unit of) the touch panel 1303.

When the measurement teaching point is acquired by using the operation system shown in FIG. 16, the operator activates the respective joints (J1 to J6) of the robotic arm 301 by using the operating keys 1301 and 1302, for example, thereby moving (the reference region, for example, of) the robotic arm 301 to the desired teaching point (the position and the orientation). Here, when numerical input keys (not shown) and the like are additionally provided to the teaching pendant 1300, it is also possible to adopt an operating method of designating the desired teaching point by inputting a numerical value representing the rotational angle of each of the joints (J1 to J6).

In the user interface in FIG. 16 used in this case, a mode display section 1304 such as "teaching of measurement teaching points" is displayed on an upper part of the touch panel 1303. Meanwhile, a propriety display section 1307 indicating propriety of the teaching point designated by moving the robotic arm 301 (or designated by inputting the numerical values), for example, is displayed at a lower part of the touch panel 1303.

In this example, the propriety display section 1307 includes: angle subsections (display subsections in rectangular frames) of the respective joints (J1 to J6) corresponding to the designated teaching point; and appropriateness display subsections (in circles) located therebelow and indicating "OK" (appropriate) or "NG" (inappropriate). In particular, the appropriateness display subsections (in circles) in the propriety display section 1307 are configured to indicate whether or not the axis values of the respective joints (J1 to J6) satisfy the measurement range (R4 in FIG. 12B) calculated in step S1200. Moreover, a numerical value display subsection 1306 to display the ranges of the axis values of the respective joints (J1 to J6) corresponding to the measurement range (R4 in FIG. 12B) is provided below the propriety display section 1307.

Here, in the example in FIG. 16, the appropriateness display subsections (in circles) in the propriety display section 1307 indicate that the axis values of the joints J1, J3, J4, and J5 satisfy the measurement ranges (R4 in FIG. 12B) for the respective axes (appropriate). On the other hand, the appropriateness display subsections (in circles) in the propriety display section 1307 indicate that the axis values of the joints J2 and J6 do not satisfy the measurement ranges (R4 in FIG. 12B) for the respective axes (no and inappropriate).

As a consequence, this display example of the user interface in FIG. 16 shows a state where the teaching point (the position and the orientation) of the robotic arm 301 is inappropriate as the measurement teaching point. When the touch panel 1303 displays the information as shown in FIG. 16, the operator designates a different teaching point by repeating the teaching operation. Thereafter, the CPU 1201 enables an input operation of a confirmation key display section 1305 (a virtual key) indicating "confirmation of measurement teaching points" at a lower part of the touch panel 1303 when all the appropriateness display subsections (in circles) in the propriety display section 1307 indicate "OK" (appropriate). After the confirmation key display section 1305 becomes operable, the operator can confirm the teaching point as the measurement teaching point by operating the confirmation key display section 1305.

Here, the same user interface as that in FIG. 16 can also be used when acquiring the pre-measurement teaching point in step S1100 described above. In this case, character strings in the mode display section 1304 and in the confirmation key display section 1305 may be changed from "measurement teaching points" in FIG. 16 into "pre-measurement teaching points" as appropriate.

After the measurement teaching point is acquired as described above, it is possible to cause the robotic arm 301 to execute an attachment action in step S1400 and so on, inclusive of the corrective action based on the measurement with the visual sensor 500 at the measurement teaching position thus acquired. Specifically, in step S1400, the visual sensor 500 is caused to perform the measurement by using the pre-measurement teaching point and the measurement teaching point taught in steps S1100 and S1300, and the robotic arm 301 is caused to execute the attachment action inclusive of the corrective action based on the measurement.

To be more specific, the CPU 1201 measures the workpiece 800 with the visual sensor 500 at the acquired measurement teaching point, and then corrects the positon and the orientation of the robotic arm 301 based on an analysis of measurement images in such a way as to align the centers 22 and 23 of the connectors 12 and 16 with each other. Thereafter, the CPU 1201 causes the robotic arm 301 to perform an inserting operation involving the connectors 12 and 16. Thus, it is possible to execute the attachment of the connectors 12 and 16 reliably and accurately.

Note that an illustrated position of step S1400 in FIG. 9 is located solely for the sake of description, and it is not always necessary to execute the processing to acquire the preceding pre-measurement teaching point or the measurement teaching point every time prior to the workpiece attachment operation in step S1400. For example, step S1400 in FIG. 9 may also be regarded as corresponding to a general assembly process in which numerous workpieces 800 are repeatedly processed by automatic execution. In this case, a process to acquire the pre-measurement teaching point and the measurement teaching point prior to the workpiece attachment operation in step S1400 may be regarded as a teaching process to program the general assembly process. In that case, the general assembly process (step S1400) is repeatedly executed by using the pre-measurement teaching point and the measurement teaching point determined in the teaching process to program the general assembly process. Then, the manipulation to attach the connectors 12 and 16 of each of the workpieces 800 is corrected every time based on the actual measurement with the visual sensor 500. Thus, in the case of processing numerous workpieces 800, the correction processing to align the centers 22 and 23 of the connectors 12 and 16 with each other is carried out in response to a grip error that may reside in each of the workpieces 800. As a consequence, it is possible to attach all the workpieces 800 accurately and reliably in the general assembly process in which numerous workpieces 800 are to be processed.

As described above, in this Example 1, the possible corrected movable range of the axis value of the certain one of joints toward the attachment teaching point is obtained based on the possible error ranges of the relative position and the relative orientation of the gripped object (the connector 12) gripped with the robotic hand 302 (the corrected movable range acquisition process). Then, in the pre-measurement teaching point determination process, the teaching point included in the range outside the corrected movable range is acquired as the pre-measurement teaching point based on the axis value of the relevant joint corresponding to the acquired corrected movable range. Meanwhile, in the measurement teaching point determination process, the teaching point included in the range between the corrected movable range and the pre-measurement teaching point is acquired as the measurement teaching point based on the axis value of the relevant joint corresponding to the acquired corrected movable range.

Specifically, the via-point outside the corrected movable range is acquired as the pre-measurement teaching point, and the measurement teaching point where the measurement with the visual sensor 500 takes place is acquired at a point between the pre-measurement teaching point and the corrected movable range where the corrective action based on the measurement takes place. Then, the robotic arm 301 is moved from the pre-measurement teaching point to the measurement teaching point, and is then caused to execute the action in the corrected movable range based on the measurement conducted at the measurement teaching point with the visual sensor 500.

In this Example 1, by performing the robot control as described above, it is possible to select the measurement teaching to perform the measurement with the visual sensor 500, so as to create the corrective action that can avoid the occurrence of the reversal of the rotation (the reverse rotation) of each of the joints (J1 to J6). In this Example 1, when the robotic arm 301 is moved from the pre-measurement teaching point to the measurement teaching point and further to the corrected movable range, the robotic arm 301 is controlled in such a way that a certain one (or all) of the joints is driven in the definite driving direction without causing the reverse rotation. For this reason, it is possible to properly suppress a control error attributed to a backlash of a drive system of each of the joints of the robotic arm 301, thereby manufacturing an article while conducting accurate and reliable workpiece attachment.

A combination of the connector-attached cable 21 and the connector 16 has been shown above as an example of the workpiece 800. However, the above-described robot control technique is not limited by aspects of the workpieces to be manipulated. The robot control technique is applicable to an arbitrary robot apparatus as long as the robot apparatus is configured to correct a gripped workpiece in response to a result of measurement with the visual sensor 500.

Example 2

Next, robot control according to Example 2 of the present invention will be described. A hardware configuration and a basic control configuration of a robot apparatus in this Example 2 are assumed to be the same as those illustrated in the drawings in conjunction with the description of Example 1.

In addition, the entire flow of the robot control of this Example 2 is also the same as that of Example 1 shown in FIG. 9. However, in this Example 2, targets for the inverse kinematic calculation to be performed in Step S400 in FIG. 9 are changed. In the above description, Example 1 explains that the inverse kinematics calculation is to be conducted in terms of all the possible combinations of the positions and the orientations (the teaching points) of the robot within the attachment correction ranges (from MAX to MIN) in FIG. 10B obtained in step S300.

However, such a calculation method is likely to incur a large amount of calculation with the CPU 1201 and cause an increase in resources required for the calculation. For instance, this configuration may require the CPU 1201 of a high-performance type or require a high-capacity memory (such as the RAM 1203 and a virtual memory).

Accordingly, in step S400 of this Example 2, the inverse kinematics calculation is executed in terms of all the combinations involving only the maximum values and the minimum values (MAX and MIN) in position information 1502 and orientation information 1503 in the attachment correction ranges instead of all the possible positions and orientations in the attachment correction ranges in FIG. 10B. As shown in a column 1501 in FIG. 13, all the combinations involving the maximum values and the minimum values (MAX and MIN) of the positions and the orientations (X, Y, Z, rX, rY, and rZ) in the attachment correction ranges (MAX to MIN) include 64 (=$2^6$) combinations of the positions and the orientations.

In this Example 2, an amount of calculation can be considerably reduced by conducting the inverse kinematics calculation as described above. Accordingly, it is possible to carry out the robot control which is equivalent to the above-described control even by using the CPU 1201 of a relatively low-speed type and/or without requiring a very large memory (such as the RAM 1203 and the virtual memory) capacity.

Example 3

Next, robot apparatus control according to Example 3 of the present invention will be described. In this Example 3 as well, a hardware configuration and a basic control configuration of a robot apparatus are assumed to be the same as those illustrated in the drawings in conjunction with the description of Example 1.

In addition, the entire flow of the robot control of this Example 3 is also the same as that of Example 1 shown in FIG. 9. However, this Example 3 adopts a different method of acquiring the via-point range outside the corrected movable range (R2) in step S900 shown in FIG. 9. Moreover, in this Example 3, measurement ranges acquired in step S1200 in FIG. 9 are different from those acquired in Example 1.

In the above description, Example 1 explains that when the range Jt[n] of the via-point (the pre-measurement teaching point) is equivalent to the corrected movable range (R2) in FIG. 12A, the range Jt[n] is defined as $-180°<Jt[n]<\theta min$ and $\theta max<Jt[n]\leq 180°$ (ranges R1 and R3) in step S900.

However, it is likely that a via-point (a pre-measurement teaching point) with which a joint drive amount from the via-point (the pre-measurement teaching point) to the measurement teaching point is rendered extremely small may be acquired (and taught) in the acquisition (and the teaching) of the pre-measurement teaching point. This case may lead to an action in which a backlash cannot be sufficiently moved to one side, and the measurement teaching point may be set up while a control error attributed to the backlash is still active, for example. Specifically, if a certain one of the joints is moved (rotated) only in a movement amount equal to or below a backlash angle $\theta b$ of a gear therein from the via-point (the pre-measurement teaching point) to the measurement teaching point, then it is likely that the backlash of the gear cannot be moved to one side due to the nature of locating the measurement teaching point between the via-point and the corrected movable range.

With that in mind, in this Example 3, the via-point range Jt[n] to be defined outside the corrected movable range (R2) is located on each of two outer sides of the corrected movable range (R2) at a distance away by at least the amount equivalent to the angle θb that corresponds to the backlash of the drive system of the joint. Here, an amount of rotation of the joint drive system corresponding to the backlash can be obtained from numerical values of backlashes and the like in a catalog for a transmission used in the joint, and stored in the ROM 1202 and the like in advance.

As a consequence of the above-described control, in this Example 3, the via-point range Jt[n] is acquired as ranges R1' and R3' located on two outer sides of the corrected movable range (R2), while each range and the corrected movable range interposing a gap at an amount of the angle θb corresponding to the backlash. Specifically, the via-point ranges (R1' and R3') are defined as −180°<Jt[n]<θmin−θb and θmax+θb<Jt[n]≤180°.

Figure 14A:
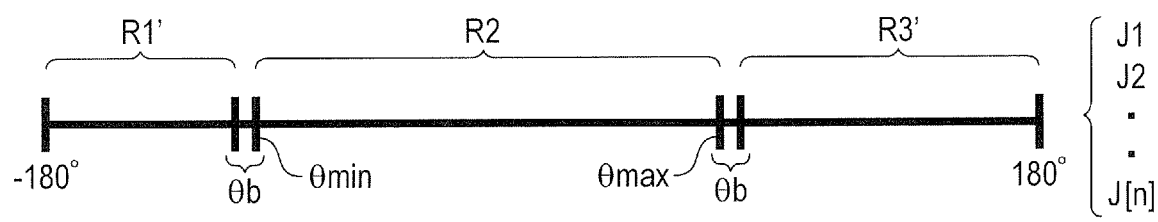
FIGS. 14A and 14B are explanatory diagrams showing a corrected movable range and a shooting region of a certain joint axis in Example 2 of the present invention.
Figure 14B:
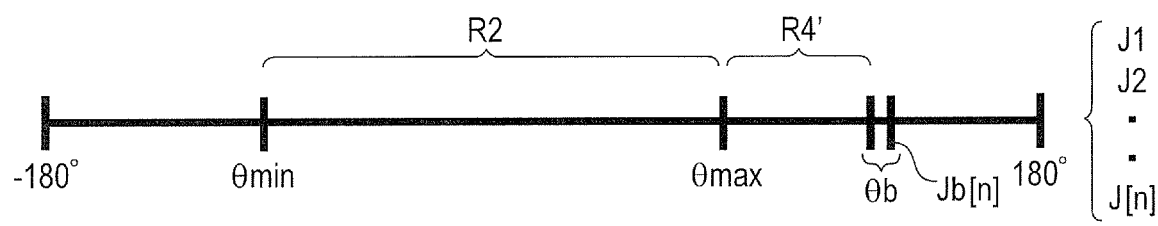

Meanwhile, in step S1200 in FIG. 9, a range (R4') of the measurement teaching point is defined as a range narrowed down by at least the amount of the angle θb corresponding to the backlash as shown in FIG. 14B due to the same reason.

As described above, in this Example 3, the via-point ranges (R1' and R3') and the range (R4') of the measurement teaching point are acquired based on a drive amount corresponding to the angle θb reflecting the backlash as mentioned above. In this way, when the gripped object (the connector 12) is moved from the pre-measurement teaching point to the measurement teaching point in particular, the certain joint is controlled in such a way as to be driven in the definite direction at least by the drive amount corresponding to the backlash of the drive system. In addition, at the time of entering the corrected movable range where the corrective action is actually carried out after the measurement at the measurement teaching point, the certain joint is controlled in such a way as to be driven in the definite direction at least by the drive amount corresponding to the backlash of the drive system as well. Therefore, according to this Example 3, the robotic arm 301 can be moved without being affected by the control error attributed to the backlash of the joint drive system during the movement from the via-point (the pre-measurement teaching point) to the measurement teaching point or from the measurement teaching point to the corrected movable range.

Example 4

Next, robot apparatus control according to Example 4 of the present invention will be described. In this Example 4 as well, a hardware configuration and a basic control configuration of a robot apparatus are assumed to be the same as those illustrated in the drawings in conjunction with the description of Example 1.

Figure 15:
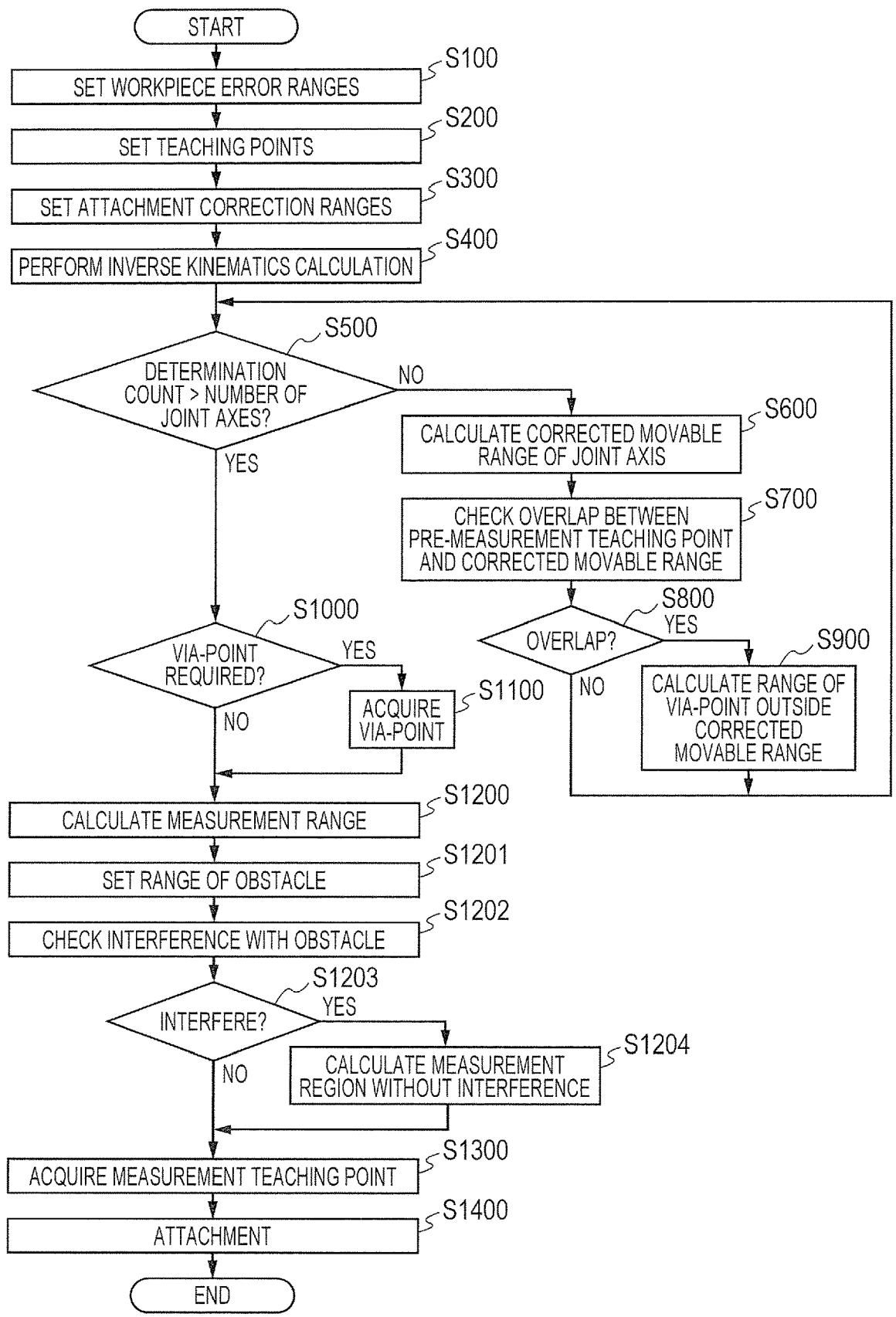
FIG. 15 is a flowchart showing robot control procedures to be conducted by a robot apparatus of Example 3 of the present invention.

The control procedures in FIG. 9 are modified in this Example 4, and the robot control is conducted in accordance with control procedures as shown in a flowchart in FIG. 15. FIG. 15 is a flowchart arranged by adding steps S1201 to S1204 to the control procedures in FIG. 9. In the following, the description of steps S100 to S1400 having already been explained in conjunction with Example 1 will be omitted, and only the processing in steps S1201 to S1204 will be explained instead.

The additional steps S1201 to S1204 in FIG. 15 correspond to control to avoid interface (interface calculation) with an obstacle in an environment where the robot apparatus 300 is installed. Such an obstacle is an object other than the robot apparatus 300 in the environment where the robot apparatus 300 is installed as well as the workpiece 800 to be handled by the robot apparatus 300. Such an obstacle is possibly another robot, and other furniture and equipment in the room, for example.

Obstacle range information, that is, information concerning a spatial range occupied by the obstacle in the environment where the robot apparatus 300 is installed is set in step S1201 in FIG. 15. The obstacle range information is expressed, for example, by a list of coordinate value corresponding to the space occupied by the obstacle in terms of a global coordinate system of the environment where the robot apparatus 300 is installed. The obstacle range information may adopt an arbitrary data storage format.

An operator or an administrator can input the obstacle range information in advance by numerical value input or through a GUI operation depending on the condition of the environment to install the robot apparatus 300. Alternatively, the CPU 1201 may possibly generate the obstacle range information from a result of recognition of image information, for example, which is obtained by measuring the environment to install the robot apparatus 300 while using the visual sensor 500. The obstacle range information thus inputted or generated can be stored in the external storage device 1204, for example, at a stage before its use in the control in FIG. 15. Then, prior to execution of the control in FIG. 15, the obstacle range information is developed in the RAM 1203 (or a virtual memory area), and the like.

When moving the robotic arm 301, the CPU 1201 performs control so as to keep the robotic arm 301, the body of the robotic hand 302, and the gripped workpiece 800 from entering the space occupied by the obstacle recorded in the obstacle range information.

For example, the CPU 1201 conducts interference check in step S1202 in FIG. 15. The interference check is conducted in order to perform the control in such a way that the robot apparatus 300 as well as the workpiece 800 gripped with the robot apparatus 300 do not enter the spatial range, which is expressed in the obstacle range information set in step S1201, during the robot action to take place afterwards in step S1400 and the like. For example, the CPU 1201 determines whether or not the current position and the current orientation of the robotic arm 301 interfere with the space occupied by the obstacle as indicated in the obstacle range information. This calculation is performed by comparison operation using the global coordinate values (and ranges thereof), for example.

Moreover, the CPU 1201 determines whether or not the position and the orientation of the robotic arm 301 corresponding to the measurement range (such as R4 and R4' in FIG. 12B and FIG. 14B), which are calculated in terms of each of the joints (J1 to J6) in step S1200, interfere with the space occupied by the obstacle indicated in the obstacle range information. Furthermore, control data to discriminate between a spatial range where the robot apparatus 300 as well as the workpiece 800 gripped with the robot apparatus 300 can enter and a spatial range where the robot apparatus 300 as well as the workpiece 800 cannot enter due to the presence of the obstacle may be generated at this time.

In step S1203, the CPU 1201 checks the presence of interference with the obstacle. Here, the CPU 1201 checks, in particular, whether or not the position and the orientation of the robotic arm 301 corresponding to the calculated measurement range (R4 and R4' in FIG. 12B and FIG. 14B) interfere with the space occupied by the obstacle indicated in the obstacle range information.

If the position and the orientation corresponding to the measurement range interfere with the space occupied by the obstacle, a range corresponding to an interfering part in the measurement range concerning each of the joints (J1 to J6) is reduced (narrowed down) in step S1204 so as to eliminate the interference, for example.

In step S1300, the measurement teaching point in the measurement range (R4 and R4' in FIG. 12B and FIG. 14B) is acquired as explained in Examples 1 and 3. Naturally, in the case where step S1204 has been carried out, the measurement range (R4 and R4' in FIG. 12B and FIG. 14B) has been modified so as not to interfere with the obstacle. As a consequence, it is possible to acquire such a measurement teaching point which does not cause the interference with the obstacle in the environment where the robot apparatus 300 is installed.

Here, if the control data to discriminate between the spatial range where the robot apparatus 300 as well as the workpiece 800 can enter and the spatial range where the robot apparatus 300 as well as the workpiece 800 cannot enter due to the presence of the obstacle is generated in step S1200, the control data can also be used in the attachment control in step S1400. While the control (the interference calculation) to avoid the interference with the obstacle in the acquisition of the measurement teaching point (S1300) has been mainly described above, the setting of the obstacle range information in step S1201, for example, can be executed at the beginning of the control procedures in FIG. 15. Moreover, by using the obstacle range information, the control to avoid the interference with the obstacle like the above-described control may also be executed in the acquisition of the pre-measurement teaching point (the via-point) (S1100), the calculation of the via-point range (S900), and the like. Furthermore, the control to avoid the interference with the obstacle in this Example 4 can be combined with the control of Example 2 and Example 3.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122168, filed Jun. 20, 2016, which is hereby incorporated by reference herein in its entirety.

What is claimed is:

1. A method of controlling a robot system including:
   a robot apparatus capable of changing any of a position and an orientation of an obtained workpiece by driving a joint,
   a measurement device configured to measure any of the position and the orientation of the workpiece, and
   a control device,
   the method comprising:
   in a case where the control device corrects any of the position and the orientation of the workpiece by controlling an operation of the joint at a first position being a target position of the workpiece, based on a measurement result of the measurement device,
      the measurement device measuring any of the position and the orientation of the workpiece at a third position, after the control device moves the workpiece from a second position being outside a possible range of a position of the joint as the first position, to the third position; and
      the control device controlling the joint such that the joint operates in one direction in a case of moving the workpiece from the second position to the third position and in a case of moving the workpiece from the third position to the first position.

2. The method of controlling a robot apparatus according to claim 1, wherein the joint of the robotic apparatus is formed of a rotary joint.

3. A non-transitory computer-readable recording medium storing a robot system control program to cause a control device in a robot system to execute controlling of the robot system, wherein the robot system includes:
   a robot apparatus capable of changing any of a position and an orientation of an obtained workpiece by driving a joint,
   a measurement device configured to measure any of the position and the orientation of the workpiece, and
   the control device,
   the program comprising code to execute:
   in a case where the control device corrects any of the position and the orientation of the workpiece by controlling an operation of the joint at a first position being a target position of the workpiece based on a measurement result of the measurement device,
   causing the measurement device to measure any of the position and the orientation of the workpiece at a third position after the control device moves the workpiece from a second position being outside a possible range of a position of the joint as the first position, to the third position; and
   causing the control device to control the joint such that the joint operates in one direction in a case of moving the workpiece from the second position to the third position and in a case of moving the workpiece from the third position to the first position.

4. A robot system comprising:
a robot apparatus capable of changing any of a position and an orientation of an obtained workpiece by driving a joint;
a measurement device configured to measure any of the position and the orientation of the workpiece; and
a control device,
wherein,
in a case where the control device corrects any of the position and the orientation of the workpiece by controlling an operation of the joint at a first position being a target position of the workpiece based on a measurement result of the measurement device,
the measurement device measures any of the position and the orientation of the workpiece at a third position after the control device moves the workpiece from a second position being outside a possible range of a position of the joint as the first position, to the third position, and
the control device controls the joint such that the joint operates in one direction in case of moving the workpiece from the second position to the third position and in case of moving the workpiece from the third position to the first position.

5. The robot system according to claim 4, wherein the robot apparatus is provided with a confinement unit configured to confine any of the position and the orientation of the workpiece to a predetermined range in a state with the workpiece obtained.

6. The robot system according to claim 4, further comprising:
a teaching device configured to perform teaching for the robot apparatus, wherein the teaching device includes:
an input device configured to input a position of the joint at a time when the workpiece is obtained by the robot apparatus, and a position of the joint at a time when any of the position and the orientation of the workpiece is measured by the measurement device; and
an output device configured to output whether or not the position of the joint at the time when the workpiece is obtained by the robot apparatus, and the position of the joint at the time when any of the position and the orientation of the workpiece is measured by the measurement device, input by the input device, are within the possible range.

7. A method of manufacturing an article using a robot system including a robot apparatus capable of changing any of a position and an orientation of an obtained workpiece by driving a joint, a measurement device configured to measure any of the position and the orientation of the workpiece, and a control device,
the method comprising:
in a case where the control device corrects any of the position and the orientation of the workpiece by controlling an operation of the joint at a first position being a target position of the workpiece, based on a measurement result of the measurement device,
the measurement device measuring any of the position and the orientation of the workpiece at a third position, after the control device moves the workpiece from a second position being outside a possible range of a position of the joint as the first position, to the third position;
the control device controlling the joint such that the joint operates in one direction in case of moving the workpiece from the second position to the third position and in case of moving the workpiece from the third position to the first position; and
the control device attaching the workpiece to a different workpiece.

8. The method of manufacturing an article according to claim 7, wherein
the control device positions the joint outside the possible range when a position of the joint is within the possible range at a time when the workpiece is obtained by the robot apparatus.

9. The method of manufacturing an article according to claim 7, wherein
the control device measures any of the position and the orientation of the workpiece by the measurement device and drives the joint in the definite direction to correct any of the position and the orientation of the workpiece before driving the joint in the definite direction to position the joint within the possible range from the state with the joint positioned outside the possible range.

10. The method of manufacturing an article according to claim 7, wherein
the control device drives the joint in the definite direction at least by a drive amount corresponding to a backlash of the joint when correcting any of the position and the orientation of the workpiece.

11. The method of manufacturing an article according to claim 7, wherein
the control device acquires the possible range based on an error of any of a possible position and a possible orientation of the workpiece in a state with the workpiece obtained by the robot apparatus.

12. The method of manufacturing an article according to claim 9, wherein
the control device acquires a position of the joint at a time when measuring any of the position and the orientation by the measurement device, based on a maximum value and a minimum value of the possible range.

13. The method of manufacturing an article according to claim 7, wherein
the robot apparatus is provided with a confinement unit configured to confine any of the position and the orientation of the workpiece to a predetermined range in a state with the workpiece obtained by the robot apparatus.

14. The method of controlling a robot system according to claim 1, wherein the control device positions the joint outside the possible range when a position of the joint is within the possible range at a time when the workpiece is obtained by the robot apparatus.

15. The method of controlling a robot apparatus according to claim 1, wherein the control device drives the joint in the definite direction at least by a drive amount corresponding to a backlash of the joint when correcting any of the position and the orientation of the workpiece.

16. The method of controlling a robot apparatus according to claim 1, wherein the control device acquires the possible range based on an error of any of a possible position and a possible orientation of the workpiece in a state with the workpiece obtained by the robot apparatus.

17. The method of controlling a robot apparatus according to claim 1, wherein the control device acquires a position of the joint at a time when measuring any of the position and the orientation by the measurement device, based on a maximum value and a minimum of the possible range.

18. The method of controlling a robot apparatus according to claim 1, wherein the robot apparatus is provided with a confinement unit configured to confine any of the position and the orientation of the workpiece to a predetermined range in a state with the workpiece obtained.

19. The method of controlling a robot apparatus according to claim 1, wherein the control device executes interference calculation to calculate a possibility of interference of the robot apparatus with a different object so as not to cause the interference when correcting any of the position and the orientation of the workpiece.

* * * * *